US010995813B2

(12) United States Patent
Yamashita et al.

(10) Patent No.: US 10,995,813 B2
(45) Date of Patent: May 4, 2021

(54) SHOCK ABSORBER

(71) Applicant: Hitachi Automotive Systems, Ltd., Ibaraki (JP)

(72) Inventors: Mikio Yamashita, Zama (JP); Ryo Shinata, Yamato (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 45 days.

(21) Appl. No.: 16/334,101

(22) PCT Filed: Sep. 26, 2017

(86) PCT No.: PCT/JP2017/034687
§ 371 (c)(1),
(2) Date: Mar. 18, 2019

(87) PCT Pub. No.: WO2018/062150
PCT Pub. Date: Apr. 5, 2018

(65) Prior Publication Data
US 2019/0368569 A1 Dec. 5, 2019

(30) Foreign Application Priority Data
Sep. 27, 2016 (JP) .............................. JP2016-188037

(51) Int. Cl.
*F16F 9/34* (2006.01)
*F16J 15/16* (2006.01)
(Continued)

(52) U.S. Cl.
CPC ............... *F16F 9/348* (2013.01); *F16J 15/16* (2013.01); *B60G 13/08* (2013.01);
(Continued)

(58) Field of Classification Search
CPC ...... F16F 9/348; F16F 9/516; F16F 2228/066; B60G 2500/11; F16J 15/16
(Continued)

(56) References Cited

U.S. PATENT DOCUMENTS 5,325,942 A * 7/1994 Groves ................. F16F 9/3484
188/282.6
5,706,919 A * 1/1998 Kruckemeyer ......... F16F 9/466
188/282.5
(Continued)

FOREIGN PATENT DOCUMENTS

DE 11 2016 004 157 T5 6/2018
EP 0317327 A2 5/1989
(Continued)

OTHER PUBLICATIONS

International Search Report of PCT/JP2017/034687 dated Nov. 14, 2017.
(Continued)

Primary Examiner — Bradley T King
Assistant Examiner — James K Hsiao
(74) Attorney, Agent, or Firm — Mattingly & Malur, P.C.

(57) ABSTRACT

A shock absorber that includes a damping force generation mechanism including a damping valve provided in a first passage through which a working fluid flows out due to a movement of a piston and a back-pressure chamber applying an internal pressure to the damping valve in a valve closing direction; and a back-pressure chamber inflow passage introducing the working fluid from the first passage into the back-pressure chamber is provided. The damping valve has: a first valve that opens and closes an opening of the first passage of the piston and comes into contact with the piston; a second valve provided on a valve opening side of the first valve and having a diameter smaller than the first valve, and
(Continued)

defines the back-pressure chamber such that a pilot valve that slidably and tightly fits a seal member having an outer circumferential portion into a cylindrical part of a pilot case.

4 Claims, 8 Drawing Sheets

(51) Int. Cl.
  *B60G 13/08* (2006.01)
  *F16F 9/348* (2006.01)
  *F16F 9/516* (2006.01)

(52) U.S. Cl.
  CPC .......... *B60G 2500/11* (2013.01); *F16F 9/516* (2013.01); *F16F 2228/066* (2013.01)

(58) Field of Classification Search
  USPC .................................................. 188/322.15
  See application file for complete search history.

(56) References Cited

U.S. PATENT DOCUMENTS

| | | | |
|---|---|---|---|
| 6,202,805 B1 | 3/2001 | Okada et al. | |
| 6,340,081 B1* | 1/2002 | Keil | F16F 9/348 188/322.13 |
| 6,668,986 B2* | 12/2003 | Moradmand | F16F 9/466 188/266.2 |
| 8,739,948 B2* | 6/2014 | McGahey | F16F 9/3488 188/322.13 |
| 8,997,952 B2* | 4/2015 | Goetz | F16F 9/464 188/282.4 |
| 9,777,790 B2* | 10/2017 | Mizuno | F16F 9/3484 |
| 9,845,839 B2* | 12/2017 | Rummel | F16F 9/18 |
| 2017/0080767 A1* | 3/2017 | Yamashita | F16F 9/348 |
| 2018/0216690 A1 | 8/2018 | Yamashita | |

FOREIGN PATENT DOCUMENTS

| | | |
|---|---|---|
| JP | 01-135936 A | 5/1989 |
| JP | 03-113139 A | 5/1991 |
| JP | 11-218176 A | 8/1999 |
| JP | 2004-257507 A | 9/2004 |
| JP | 2005-344734 A | 12/2005 |
| JP | 2005-344911 A | 12/2005 |
| JP | 2006-038097 A | 2/2006 |
| JP | 2015-083881 A | 4/2015 |
| WO | 2015/080056 A1 | 6/2015 |

OTHER PUBLICATIONS

German Office Action received in corresponding German Application No. 11 2017 004 850.8 dated Mar. 10, 2021.

* cited by examiner

SHOCK ABSORBER

TECHNICAL FIELD

The present disclosure relates to a shock absorber.

Priority is claimed on Japanese Patent Application No. 2016-188037, filed Sep. 27, 2016, the content of which is incorporated herein by reference.

BACKGROUND ART

Conventionally, a shock absorber which adjusts a valve-opening pressure of a disk valve by an internal pressure of a back-pressure chamber (e.g., see Patent Document 1) is known.

CITATION LIST

Patent Document

[Patent Document 1]
Japanese Unexamined Patent Application, First Publication No. 2005-344911

SUMMARY OF INVENTION

Technical Problem

The shock absorber which has a transient characteristic at the time of valve opening to be smooth is required.

Therefore, an object of the present invention is to provide a shock absorber capable of smoothing a transient characteristic at the time of valve opening.

Solution to Problem

According to a first aspect of the present invention, a shock absorber includes: a cylinder in which a working fluid is encapsulated; a piston that is slidably fitted into the cylinder and is configured to partition an inside of the cylinder into two chambers that are a first chamber and a second chamber; a piston rod that is coupled to the piston and is configured to extend to an outside of the cylinder; a first passage which is provided in the piston and through which the working fluid flows out of the first chamber due to movement of the piston; a damping force generation mechanism that includes a damping valve and a back-pressure chamber, the damping valve being provided in the first passage and generating a damping force by inhibiting a flow of the working fluid that caused by sliding of the piston, the back-pressure chamber applying an internal pressure to the damping valve in a valve closing direction; and a back-pressure chamber inflow passage that is configured to introduce the working fluid from the first passage into the back-pressure chamber. The damping valve has: a first valve that opens and closes an opening of the first passage formed in the piston and comes into contact with the piston; a second valve that has an outer diameter smaller than the first valve and is provided on a valve opening side of the first valve; and a pilot valve that has an annular seal member at an outer circumferential portion thereof and defines the back-pressure chamber such that the seal member is slidably and tightly fitted into a cylindrical part included in a pilot case.

According to a second aspect of the present invention, the shock absorber according to the first aspect may further include: a second passage configured to branch off from any portion from the first passage to the back-pressure chamber; a housing which is provided in the second passage and inside which the piston rod is disposed; an annular third valve which is supported on an inner circumferential side thereof or an outer circumferential side thereof and provided with an annular elastic seal member on an unsupported side of third valve, the third valve being bendable, and the elastic seal member sealing between the annular elastic seal member and the housing or between the annular elastic seal member and the piston rod; and two chambers provided inside the housing so as to be defined by the third valve. The third valve may obstruct circulation of the working fluid toward at least one side of the second passage.

According to a third aspect of e present invention, in the shock absorber according to the first or second aspect, the second valve made up of the same diameter part having the same outer diameter as the first valve and a small diameter part having an outer diameter smaller than the same diameter part, and the first valve is opened stepwise by the same diameter part and the small diameter part of the second valve.

According to a fourth aspect of the present invention, in the shock absorber according to any one of the first to third aspects, the back-pressure chamber inflow passage may use a cutout part formed on an outer circumferential portion of the piston rod by cutting out a part of a passage groove.

Advantageous Effects of Invention

According to the present invention, a transient characteristic at the time of valve opening can be made smooth in the shock absorber.

DESCRIPTION OF EMBODIMENTS

First Embodiment

Figure 1:
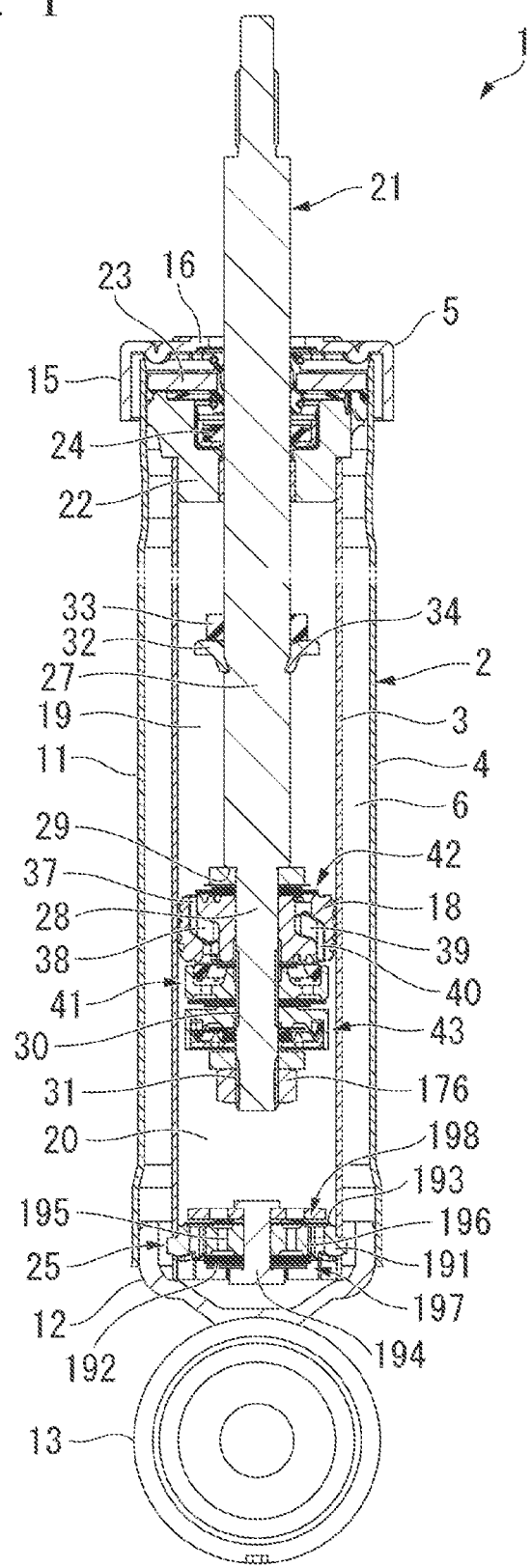
FIG. 1 is a sectional view illustrating a shock absorber according to a first embodiment of the present invention.

A first embodiment of the present invention will be described on the basis of FIGS. 1 to 7. In the following description, for convenience of the description, an upper side in the drawings is described as "up," and a lower side in the drawings is described as "down."

As illustrated in FIG. 1, a shock absorber 1 according to a first embodiment is a so-called double cylinder type hydraulic shock absorber, and includes a cylinder 2 in which oil (not shown) acting as a working fluid is encapsulated. The cylinder 2 has a cylindrical inner cylinder 3, an outer cylinder having a bottomed cylindrical shape, and a cover 5, and a reservoir chamber 6 is formed between the inner cylinder 3 and the outer cylinder 4. The outer cylinder 4 has a diameter larger than the inner cylinder 3 and is concentrically provided to cover the inner cylinder 3. The cover 5 is provided to cover an upper opening side of the outer cylinder 4.

The outer cylinder 4 is made up of a cylindrical barrel member 11 and a bottom member 12. The bottom member 12 is fixedly fitted on a lower portion side of the barrel member 11, and blocks a lower portion of the barrel member 11. A mounting eye 13 is fixed to the bottom member 12 on an outside opposite to the barrel member 11.

The cover 5 has a cylindrical part 15 and an inner flange part 16. The inner flange part 16 extends inward from an upper end side of the cylindrical part 15 in a radial direction. The cover 5 covers the barrel member 11 so as to cover an tipper end opening of the barrel member 11 with the inner flange part 16 and so as to cover an outer circumferential surface of the barrel member 11 with the cylindrical part 15. In this state, the coves 5 and a part of the cylindrical part 15 are swaged inward in a radial direction, so that the cover 5 is fixed to the barrel member 11.

The shock absorber 1 includes a piston 18 that is slidably fitted into the inner cylinder 3 of the cylinder 2. The piston 18 partitions the inside of the inner cylinder 3 into two chambers that are one upper chamber (a first chamber) 19 and another lower chamber a second chamber) 20. Oil acting as a working fluid is encapsulated in the upper and lower chambers 19 and 20 inside the inner cylinder 3. Oil and gas acting as working fluids are encapsulated in the reservoir chamber 6 between the inner cylinder 3 and the outer cylinder 4.

The shock absorber 1 includes a piston rod 21. One end side of the piston rod 21 is disposed in the inner cylinder 3 of the cylinder 2 and is coupled to the piston 18, and the other end side of the piston rod 21 extends to an outside of the cylinder 2. The piston 18 and the piston rod 21 move integrally. In an extension stroke where the piston rod 21 increases an amount of protrusion from the cylinder 2, the piston 18 moves toward the upper chamber 19. In a contraction stroke where the piston rod 21 reduces the amount of protrusion from the cylinder 2, the piston 18 moves toward the lower chamber 20.

A rod guide 22 is fitted into upper end openings of the inner and outer cylinders 3 and 4. A seal member 23 is mounted on an upper side, where is an outer side of the cylinder 2 than the rod guide 22, of the outer cylinder 4. A friction member 24 is provided between the rod guide 22 and the seal member 23. All of the rod guide 22, the seal member 23, and the friction member 24 have annular shapes. The piston rod 21 is slidably inserted inside the rod guide 22, the friction member 24, and the seal member 23, and extends outward from the inside of the cylinder 2.

The rod guide 22 supports the piston rod 21 to be movable in an axial direction while regulating movement of the piston rod 21 in a radial direction, and guides the movement of the piston rod 21. An outer circumferential portion of the seal member 23 is closely attached to the outer cylinder 4, and an inner circumferential portion of the seal member 23 is in sliding contact with an outer circumferential portion of the piston rod that moves in an axial direction, so that the oil in the inner cylinder 3 and a high-pressure gas and the oil of the reservoir chamber 6 in the outer cylinder 4 are prevented from leaking to the outside. An inner circumferential portion of the friction member 24 is in sliding contact with the outer circumferential portion of the piston rod 21, and the friction member 24 generates frictional resistance at the piston rod 21. The friction member 24 is not a member intended for sealing.

An outer circumferential portion of the rod guide 22 is formed in a stepped shape in which an upper portion thereof has a larger diameter than a lower portion thereof. The rod guide 22 is fitted into an inner circumferential portion of an upper end of the inner cylinder 3 at the lower portion thereof having a small diameter, and is fitted into an inner circumferential portion of an upper portion of the outer cylinder 4 at the upper portion thereof having a large diameter. A base valve 25 for defining the lower chamber 20 and the reservoir chamber 6 is provided on the bottom member 12 of the outer cylinder 4. An inner circumferential portion of a lower end of the inner cylinder 3 is fitted into the base valve 25. An upper end portion of the outer cylinder 4 is partly swaged inward in a radial direction (which is not shown), and the seal member 23 is sandwiched between the swaged portion and the rod guide 22.

The piston rod 21 has a main shaft part 27 and a mounting shaft part 28 having a smaller diameter than the main shaft part 27. The mounting shaft part 28 is disposed in the cylinder 2, and the piston 18 or the like is mounted thereon. An end portion of the main shaft part 27 which is close to the mounting shaft part 28 forms a stepped shaft part 29 that widens in a direction orthogonal to an axis thereof. A passage groove 30 and male threads 31 are formed at an outer circumferential portion of the mounting shaft part 28. The passage groove 30 is formed at an intermediate position in an axial direction to be cut out and extend in the axial direction. The male threads 31 are formed at an outer circumferential portion of a tip position, where is opposite to the main shaft part 27 in an axial direction, of the mounting shaft part 28. The passage groove 30 is formed such that a shape of a cross section thereof in a plane orthogonal to a central axis of the piston rod 21 has any one of a rectangular shape, a square shape, and a D shape.

The piston rod 21 is provided with an annular stopper member 32 and an annular cushion 33 at a portion where is between the piston 18 and the rod guide 22 of the main shaft part 27. The piston rod 21 is inserted on an inner circumferential side of the stopper member 32, and the stopper member 32 is swaged and fixed to a fixing groove 34 recessed inward in a radial direction of the main shaft part 27. The piston rod 21 is also inserted inside the cushion 33, and the cushion 33 is disposed between the stopper member 32 and the rod guide 22.

In the shock absorber for example, a protruded part of the piston rod 21 which protrudes from the cylinder 2 is disposed upside and is supported by a vehicle body, and the mounting eye 13 close to the cylinder 2 is disposed downside and is coupled to a wheel side. On the other hand, the shock absorber 1 may be configured such that portion close to the cylinder 2 is supported by the vehicle body and the piston rod 21 is coupled to the wheel side. When the wheel vibrates in accordance with traveling, positions of the cylinder 2 and the piston rod 21 are relatively changed in accordance with the vibration. This change is inhibited by fluid resistance of a flow passage formed in at least one of the piston 18 and the piston rod 21. As will be described below in detail, the flow passage formed in at least one of the piston 18 and the piston rod 21 is made such that the fluid resistance thereof differs according to a speed and an amplitude of the vibration, and inhibits the vibration, so that ride quality of the vehicle body is improved. In addition to the vibration generated by the wheel, an inertial force and a centrifugal force generated at the vehicle body in accordance with traveling of a vehicle are also applied between the cylinder 2 and the piston rod 21. As a traveling direction is changed, for example, by a steering wheel operation, the centrifugal force occurs at the vehicle body, and a force based on the centrifugal force is applied between the cylinder 2 and the piston rod 21. As will be described below, the shock absorber 1 has a good characteristic with respect to the vibration based on the force generated at the vehicle body in accordance with the traveling of the vehicle, and high stability is capable of being obtained during the traveling of the vehicle.

As illustrated the piston 18 is made up of a piston main body 35 and a sliding member 36. The piston main body 35 is a member that is formed of a metal and is supported by the piston rod 21. The sliding member 36 is an annular member that is formed of a synthetic resin, is integrally mounted on an outer circumferential surface of the piston main body 35, and slides in the inner cylinder 3.

Figure 2:
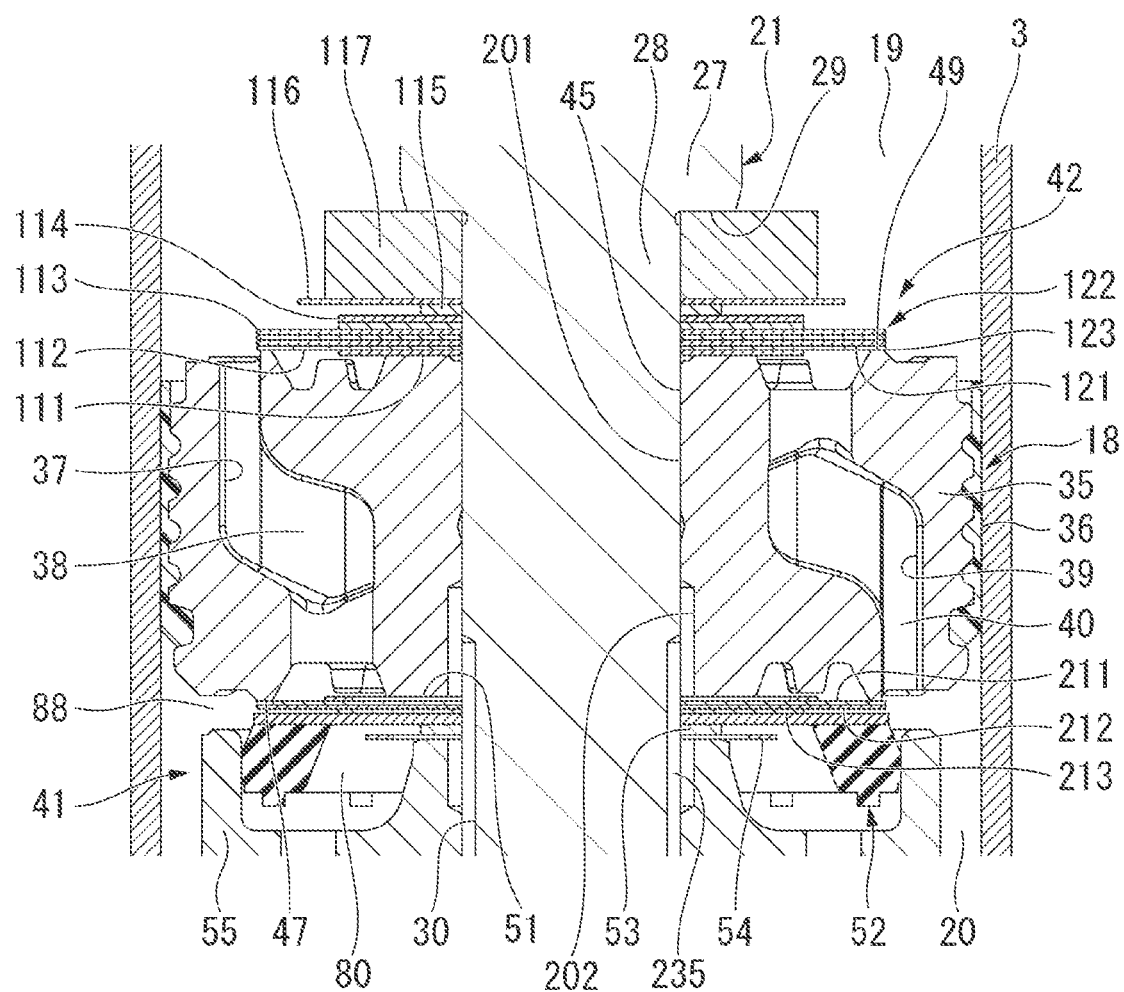
FIG. 2 is a partial sectional view illustrating surroundings of a piston of the shock absorber according to the first embodiment of the present invention.

A plurality of first passage holes 37 (only one of which is illustrated in FIG. 2 because of a sectioned relationship) that communicate the upper chamber 19 and the lower chamber 20 with each other and a plurality of second passage holes 39 (only one of which is illustrated in FIG. 2 because of a sectioned relationship) that communicate the upper chamber 19 and the lower chamber 20 with each other are provided in the piston main body 35. The plurality of first passage holes 37 are formed at a regular pitch in a circumferential direction such that one of the second passage holes 39 is sandwiched between the first passage holes 37, and account for half of the total number of passage holes 37 and 39. The plurality of first passage holes 37 open in the first sides thereof (an upper side of FIG. 2) in the axial direction of the piston 18 at outer side in the radial direction, and open in the second sides thereof (a lower side of FIG. 2) in the axial direction of the piston 18 at inner side in the radial direction.

Figure 3:
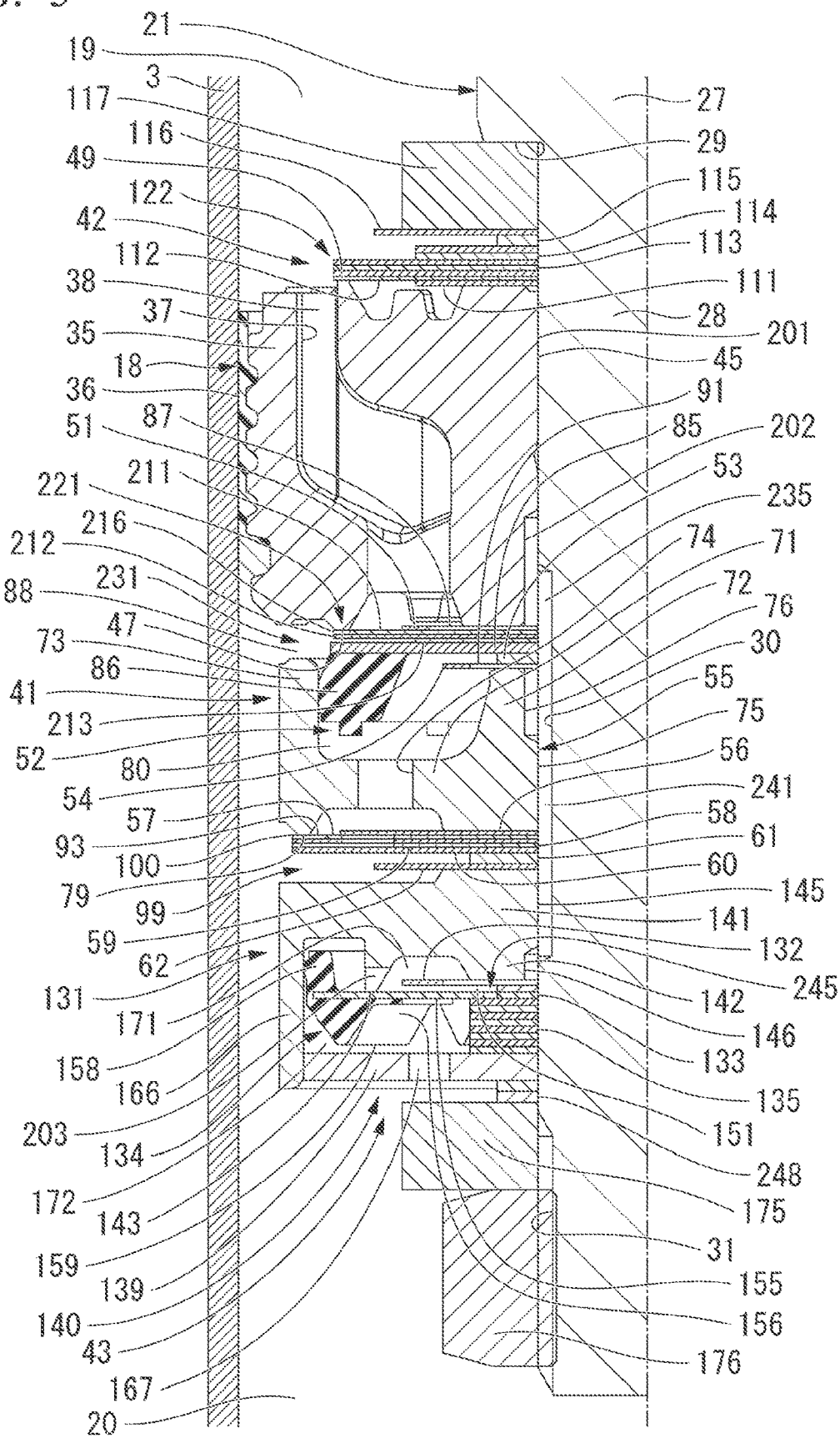
FIG. 3 is a partial sectional view illustrating surroundings of the piston, a damping force generation mechanism, and a damping force variable mechanism of the shock absorber according to the first embodiment of the present invention.

As illustrated in FIG. 3, a damping force generation mechanism 41 is provided for the first passage holes 37. The damping force generation mechanism 41 is configured to open and close passages (first passages) 38 inside the first passage holes 37 to generate a damping force. The damping force generation mechanism 41 is disposed close to the lower chamber 20 that is one end side in the axial direction of the piston 18 in the axial direction, and is mounted on the piston rod 21. Since the damping force generation mechanism 41 is disposed close to the lower chamber 20, the passages 38 formed inside the plurality of first passage holes 37 function as passages for flowing out oil acting as a working fluid from the one upper chamber 19 toward the other lower chamber 20 when the piston 18 moves toward the upper chamber 19 of the piston 18, i.e., in an extension stroke. The damping force generation mechanism 41 provided for the passages 38 is an extension-side damping force generation mechanism that inhibits a flow of oil of the extension-side passages 38 to generate a damping force. A damping force variable mechanism 43 is mounted on the mounting shaft part 28 of the piston rod 21 adjacent to the damping force generation mechanism 41 on the opposite side of the piston 18 in the axial direction. The damping force variable mechanism 43 is a mechanism that makes a damping force variable in response to a frequency of reciprocation of the piston 18 (hereinafter referred to as "piston frequency").

The second passage holes 39 that account for the remaining half of the plurality of passage holes 37 and 39 illustrated in FIG. 2 are formed at a regular pitch in a circumferential direction such that one of the first passage holes 37 is sandwiched between the second insertion holes 39. The second passage holes 39 open in second sides thereof (the lower side of FIG. 2) in the axial direction of the piston 18 at outer side in the radial direction, and open in first sides thereof (the upper side of FIG. 2) in the axial direction of the piston 18 at inner side in the radial direction.

A damping force generation mechanism 42 is provided for the second passage holes 39. The damping force generation mechanism 42 is configured to open and close passages 40 inside the second passage holes 39 to generate a damping force. The damping force generation mechanism 42 is disposed close to the upper chamber 19 that is the first side in the axial direction of the piston 18 in the axial direction, is mounted on the piston rod 21. Since the damping force generation mechanism 42 is disposed close to the upper chamber 19, the passages 40 formed inside the plurality of second passage holes 39 function as passages for flowing out oil from the lower chamber 20 toward the upper chamber 19 when the piston 18 moves toward the lower chamber 20 of the piston 18, i.e., in a contraction stroke. The damping force generation mechanism 42 provided for the passages 40 is a contraction-side damping force generation mechanism that inhibits a flow of oil of the compression-side passages 40 to generate a damping force.

With the above constitution, the upper chamber 19 and the lower chamber 20 are communicated with each other such that the oil that is the working fluid flows between the upper chamber 19 and the lower chamber 20 through the passages 38 inside the plurality of first passage holes 37 and the passages 40 inside the plurality of second passage holes 39 clue to the movement of the piston 18. As a result, the oil flows through the passages 38 when the piston rod 21 and the piston 18 move to an extension side (the upper side of FIG. 2), and the oil flows through the passages 40 when the piston rod 21 and the piston 18 move to a contraction side (the lower side of FIG. 2).

The piston main body 35 has approximately a disk shape. A fitting hole 45 for fitting the mounting shaft part 28 of the piston rod 21 is formed to pass through the piston main body 35 in the center of the piston main body 35 in the radial direction. A portion between the fitting hole 45 and the first passage holes 37 at an end portion of the piston main body 35 which is close to the lower chamber 20 in the axial direction supports an inner circumferential side of the damping force generation mechanism 41. A portion between the fitting hole 45 and the second passage holes 39 at an end portion of the piston main body 35 which is close to the upper chamber 19 in the axial direction supports an inner circumferential side of the damping force generation mechanism 42.

An annular valve seat part 47 that is a part of the damping force generation mechanism 41 is formed at the end portion of the piston main body 35 which is close to the lower chamber 20 in the axial direction where is outside of openings, which is close to the lower chamber 20, of the first passage holes 37. An annular valve seat part 49 that is a part of the damping force generation mechanism 42 is formed at the end portion of the piston main body 35 which is close to the upper chamber 19 in the axial direction where is outside of openings, which are close to the upper chamber 19 in the radial direction, of the second passage holes 39. The fitting hole 45 of the piston main body 35 has a small-diameter hole 201 that is located close to the valve seat part 49 in the axial direction, and a large-diameter hole 202 that is located closer to the valve seat part 47 than the small-diameter hole 201 in the axial direction and has a diameter larger than that of the small-diameter hole 201. The mounting shaft part 28 of the piston rod 21 is fitted into the small-diameter hole 201.

The piston again body 35 is formed in a stepped shape in which a height thereof in the axial direction is lower than the valve seat part 47 on a side of the valve seat part 47 which is opposite to the fitting hole 45 (on an outer side of the valve seat part 47 in the radial direction), and openings of the passages 40, which are close to the lower chamber 20, inside the contraction-side second passage holes 39 are disposed in this stepped portion. Likewise, the piston main body 35 is formed in a stepped shape where the height thereof in the axial direction is lower than the valve seat part 49 on a side of the valve seat part 49 which is opposite to the fitting hole 45 (on an outer side of the valve seat part 49 in the radial direction), and openings of the passages 38, which are close to the upper chamber 19, inside the extension-side first passage holes 37 are disposed in this stepped portion.

As illustrated in FIG. 3, the extension-side damping force generation mechanism 41 is a pressure control type valve mechanism. The extension-side damping force generation mechanism 41 has a disk 51, a disk 211, a disk 212, a disk 213 (second valve), a pilot valve 52, a disk 53, a disk 54, a single pilot case 55, a disk 56, a disk 57, a disk 58, a disk 59, a disk 60, a disk 61, and a disk 62 in this order from the piston 18 side in the axial direction. The disks 51, 53, 54, 56 to 62, 211, 212 and 213 and the pilot case 55 are formed of a metal. Each of the disks 51, 53, 54, 56 to 62, 211, 212 and 213 has the shape of a perforated flat plate into which the mounting shaft part 28 of the piston rod 21 can be fitted and which has a constant thickness. Each of the pilot valve 52 and the pilot case 55 has the shape of a circular ring into which the mounting shaft part 28 of the piston rod 21 can be fitted. The disks 51, 53, 54, 56 to 62, 211 and 212 other than the disk 213 have circular plate shapes.

The pilot case 55 has a bottom part 71 shaped of a perforated circular plate, an inner cylindrical part 72 that is formed on an inner circumferential side of the bottom part 71 and has a cylindrical shape which is formed along a thickness direction of the bottom part 71, and an outer cylindrical part (a cylindrical part) 73 that is formed on an outer circumferential side of the bottom part 71 and has a cylindrical shape which is formed along the thickness direction of the bottom part 71. The bottom part 71 deviates to the second side in the axial direction with respect to the inner cylindrical part 72 and the outer cylindrical part 73. A through-hole 74, which passes through the bottom part 71 in the axial direction, is formed in the bottom part 71. In an inner circumference of the inner cylindrical part 72, a small-diameter hole 75 is formed close to the bottom part 71 in the axial direction, and a large-diameter hole 76 having a larger diameter than the small-diameter hole 75 is formed on the opposite side of the bottom part 71 in the axial direction. The mounting shaft part 28 of the piston rod 21 is fitted into the small-diameter hole 75.

An end portion of the pilot case 55 on a side of the inner cylindrical part 72 which is opposite to the bottom part 71 in the axial direction supports an inner circumferential side of the disk 54, and an end portion of the inner cylindrical part 72 which is close to the bottom part 71 in the axial direction supports an inner circumferential side of the disk 56. An end portion of the pilot case 55 in the vicinity of the bottom part 71 in the axial direction of the outer cylindrical part 73 serves as an annular valve seat part 79. A part of the pilot case 55 between the inner cylindrical part 72 and the outer cylindrical part 73 including the through-hole 74 is constructed for back-pressure chamber 80 that applies a pressure to the pilot valve 52 in the direction of the piston 18.

Figure 4:
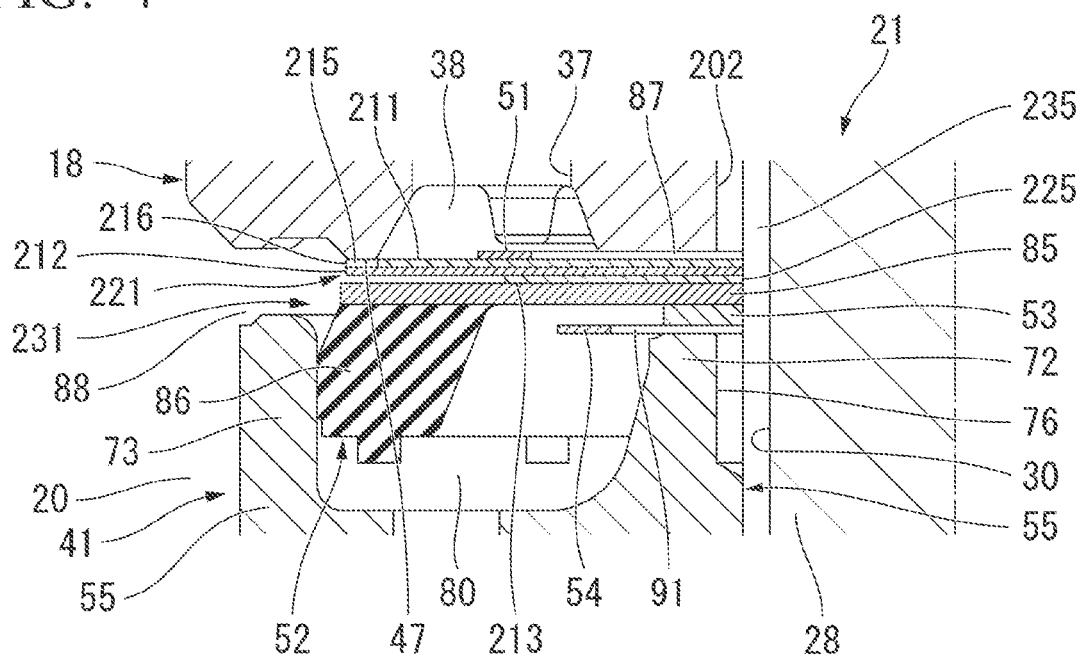
FIG. 4 is a partial sectional view illustrating surroundings of a damping valve of the shock absorber according to the first embodiment of the present invention.

As illustrated in FIG. 4, the disk 51 has an outer diameter smaller than an inner diameter of the valve seat part 47. A cutout 87 that extends outward in the radial direction from an inner circumferential edge of the disk 51, which is fitted around the mounting shaft part 28 of the piston rod 21, is formed in the disk 51. A passage inside the cutout 87 always communicates with the passages 38 of the piston 18. The passages 38 always communicate with a passage between the large-diameter hole 202 of the piston 18 and the mounting shaft part 28 and a passage inside the passage groove 30 of the piston rod 21 via the passage inside the cutout 87.

The disk 211 has an outer diameter larger than an outer diameter of the valve seat part 47 of the piston 18. The disk 211 is in contact with the valve seat part 47, and is separated from and comes into contact with the valve seat part 47, thereby the openings of the passages 38 inside the first passage holes 37 formed in the piston 18 is opened and closed. A cutout 215 is formed on an outer circumferential side of the disk 211, and the cutout 215 crosses the valve seat part 47 in the radial direction. Accordingly, an inner side of the cutout 215 constitutes a stationary orifice 216 that always causes the passages 38 to communicate with the lower chamber 20. The disk 212 has a circular outer circumferential portion, and has the same outer diameter as the disk 211. The disks 211 and 212 constitute a contact valve (a first valve) 221 that is in contact with the valve seat part 47 of the piston 18, and are separated from and come into contact with the valve seat part 47, thereby the openings of the passages 38 formed in the piston 18 is opened and closed.

Figure 5:
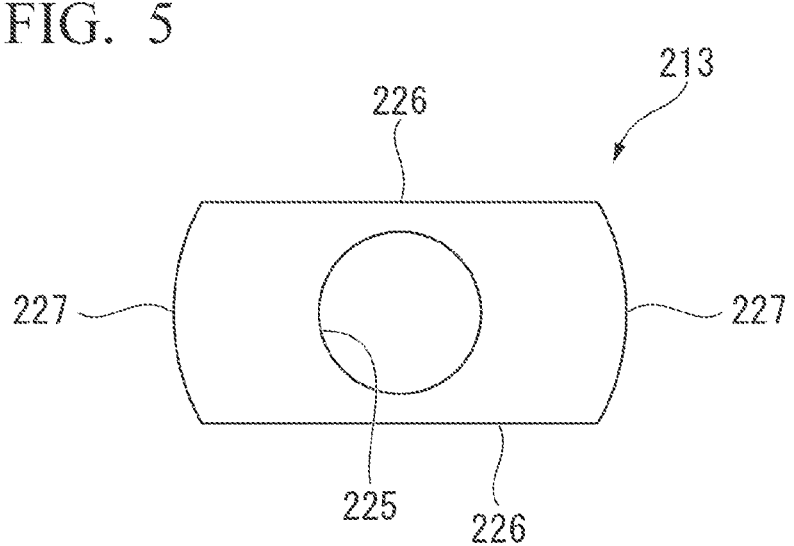
FIG. 5 is a plan view illustrating a disk acting as a second valve of the shock absorber according to the first embodiment of the present invention.

As illustrated in FIG. 5, the disk 213 has a through-hole 225 formed to pass through the center thereof in a thickness direction, and has a band plate shape that is long in one radial direction of the through-hole 225. The disk 213 has a pair of linear outer edges 226 that are parallel with each other, and a pair of outer edges 227 that have circular arc shapes bulging out in directions opposite to each other. The pair of outer edges 227 having circular arc shapes are disposed on the same circle whose center is the center of the through-hole 225 and whose diameter is an outer diameter of the disk 213. As illustrated in FIG. 4, the mounting shaft part 28 of the piston rod 21 is fitted into the through-hole 225 of the disk 213. The disk 213 has an outer diameter smaller than the contact valve 221 made up of the disks 211 and 212 having the same outer diameters. The disk 213 is provided on the opposite side of the valve seat part 47, that is, on an opened valve side in the contact valve 221. The disk (the second valve) 213 has the outer edges 227 that are the same diameter portions as the contact valve (the first valve) 221 and the outer edges 226 that is smaller diameter portions having a smaller diameter than the contact valve 221, and the contact valve 221 can be opened step by step by the same diameter portions and the smaller diameter portions of the disk 213.

The pilot valve 52 is made up of a metal disk 85 and a rubber seal member 86 fixedly attached to the disk 85. The disk 85 has the shape of a perforated circular flat plate into which the mounting shaft part 28 of the piston rod 21 is capable of being fitted and which has a constant thickness. The disk 85 has a slightly larger outer diameter than the contact valve 221 made up of the disks 211 and 212. The seal member 86 is fixedly attached on an outer circumferential side of the disk 85 which is opposite to the piston 18, and has an annular shape. In other words, the pilot valve 52 has the annular seal member 86 at an outer circumferential portion thereof.

The seal member 86 is slidably and liquid-tightly fitted throughout an inner circumferential surface of the outer cylindrical part 73 of the pilot case 55, and always seals a gap between the pilot valve 52 and the outer cylindrical part 73. In other words, the pilot valve 52 fits the seal member 86 into the outer cylindrical part 73 of the pilot case 55 in a slidable and liquid-tight manner. As a result, the back-pressure chamber 80 is defined between the pilot valve 52 and the pilot case 55.

As described above, in the contact valve 221, the disk 211 is capable of being seated on the valve seat part 47 of the piston 18. The contact valve 221, the disk 213, and the pilot valve 52 are provided in the passages 38 inside the first passage holes 37 formed in the piston 18, and constitute a damping valve 231. The damping valve 231 is configured to inhibit a flow of oil caused by sliding the piston 18 toward the extension side (the upper side of FIG. 4) to generate a damping force. The back-pressure chamber 80 between the pilot valve 52 and the pilot case 55 applies an internal pressure to the damping valve 231 in the direction of the piston 18, that is, in a valve closing direction which the contact valve 221 is seated on the valve seat part 47. The damping valve 231 is a pilot type damping valve having the back-pressure chamber 80. The clamping valve 231 and the back-pressure chamber 80 constitute a part of the damping force generation mechanism 41. In other words, the damping force generation mechanism 41 includes the damping valve 231 and the back-pressure chamber 80.

An outer diameter of the disk 53 is the same as that of an end portion of the inner cylindrical part 72 of the pilot case 55 and is larger than an inner diameter of the large-diameter hole 76. An outer diameter of the disk 54 is larger than that of a portion of the inner cylindrical part 72 which comes into contact with the disk 54. A cutout 91, which extends outward in the radial direction from an inner circumferential edge thereof fitted around the mounting shaft part 28 of the piston rod 21, is formed in the disk 54. A passage inside the cutout 91 always communicates with the back-pressure chamber 80. The back-pressure chamber 80 always communicates with a passage between the large-diameter hole 76 of the pilot case 55 and the mounting shaft part 28 and the passage inside the passage groove 30 of the piston rod 21 via the passage inside the cutout 91.

The passage inside the cutout 87 of the disk 51, the passage between the large-diameter hole 202 of the piston 18 and the mounting shaft part 28, the passage inside the passage groove 30 of the piston rod 21, the passage inside the cutout 91 of the disk 54, and the passage between the large-diameter hole 76 of the pilot case 55 and the mounting shaft part 28 serve as a back-pressure chamber inflow passage 235. The back-pressure chamber inflow passage 235 always causes the passages 38 of the piston 18 to communicate with the back-pressure chamber 80, and introduces oil from the passages 38 into the back-pressure chamber 80. When the disk 211 is unseated from the valve seat part 47 of the piston 18 and thus the damping valve 231 is opened, the damping valve 231 allows the oil from the passages 38 to flow to the lower chamber 20 via a passage 88 that is widened between the piston 18 and the outer cylindrical part 73 of the pilot case 55 in the radial direction. The extension-side damping force generation mechanism 41 introduces a part of the flow of the oil into the back-pressure chamber 80 via the back-pressure chamber inflow passage 235, and controls opening and closing of the damping valve 231 by means of a pressure of the back-pressure chamber 80.

As illustrated in FIG. 3, the disk 56 has an outer diameter smaller than an inner diameter of the valve seat part 79 of the pilot case 55. The disk 57 has an outer diameter slightly larger than an outer diameter of the valve seat part 79, and is capable of being seated on the valve seat part 79. A cutout 93 is formed on an outer circumferential side of the disk 57. The cutout 93 crosses the valve seat part 79 in the radial direction.

The disk 58, the disk 59, and the disk 60 have the same outer diameters as the outer diameter of the disk 57. An outer diameter of the disk 61 is smaller than the outer diameter of the disk 60. An outer diameter of the disk 62 is larger than the outer diameter of the disk 61, and is smaller than the outer diameter of the disk 60.

The disks 57 to 60 is capable of being unseated from and seated on the valve seat part 79, and constitute a disk valve 99. The disks 57 to 60 are unseated from the valve seat part 79, thereby causing the back-pressure chamber 80 to communicate with the the lower chamber 20 and inhibiting a flow of oil between the chambers. The back-pressure chamber 80 is surrounded and defined by the pilot valve 52, the pilot case 55, and the disk valve 99. An inner side of the cutout 93 of the disk 57 constitutes a stationary orifice 100 that causes the back-pressure chamber 80 to communicate with the lower chamber 20 even a state where the disk 57 is in contact with the valve seat part 79. The disk 62 comes into contact with the disk 60 at the time of deformation of the disk valve 99 in an opening direction, and inhibits the deformation of the disk valve 99.

As illustrated in FIG. 2, the contraction-side damping force generation mechanism 42 has a disk 111, a disk 112, a plurality of disks 113, a plurality of disks 114, a disk 115, a disk 116, and an annular member 117 in this order from the vicinity of the piston 18 in the axial direction. The disks 111 to 116 and the annular member 117 are formed of a metal, and each has the shape of a perforated circular plate into which the mounting shaft part 28 of the piston rod 21 is capable of being fitted and which has a constant thickness.

An outer diameter f the disk 111 is smaller than an inner diameter of the valve seat part 49 of the piston 18. The disk 112 has a slightly larger outer diameter than an outer diameter of the valve seat part 49 of the piston 18, and is configured to be sealable on the valve seat part 49. A cutout 121 is formed on an outer circumferential side of the disk 112. The cutout 121 crosses the valve seat part 49 in the radial direction.

The plurality of disks 113 are common components of the same material and the same shape, and have the same outer diameters as the outer diameter of the disk 112. The plurality of disks 114 are common components of the same material and the same shape, and have outer diameters smaller than the outer diameters of the disks 113. An outer diameter of the disk 115 is smaller than the outer diameters of the disks 114. An outer diameter of the disk 116 is larger than the outer diameters of the disks 114, and is smaller than the outer diameters of the disks 113. The annular member 117 has an outer diameter smaller than the outer diameter of the disk 116. The annular member 117 is thicker than the disks 111 to 116 and is high in rigidity. The annular member 117 is in contact with the stepped shaft part 29 of the piston rod 21.

The disks 112 to 114 are capable of being unseated from and seated on the valve seat part 49, and constitute a disk valve 122. The disks 112 to 114 are unseated from the valve seat part 49, thereby allowing the passages 40 inside the second passage holes 39 to be opened to the upper chamber 19 and inhibiting a flow of oil between the upper chamber 19 and the lower chamber 20. The cutout 121 of the disk 112 constitutes a stationary orifice 123 that causes the upper chamber 19 to communicate with the lower chamber 20 even in a state where the disk 112 is in contact with the valve seat part 49. The disk 116 regulates deformation of the disk valve 122 in an opening direction to or above a prescribed level.

In the present embodiment, the example in which both the extension-side disk valve 99 and the contraction-side disk valve 122 illustrated in FIG. 3 are disk valves of inner circumferential clamps has been shown, but the present invention is not limited thereto. The extension-side and contraction-side disk valves need only be mechanisms for generating a damping force. The extension-side and contraction-side disk valves may be used as, for example, lift type valves that bias the disk valves with coil springs, or may be poppet valves.

The damping force variable mechanism 43 has a single housing main body 131, a disk 132, two disks 133 and a partition disk 134 (both of which constitute a third valve), a plurality of disks 135, and a lid member 139 in this order from the vicinity of the damping force generation mechanism 41 in the axial direction. The housing main body 131, the disks 132, 133 and 135, and the lid member 139 are formed of a metal. Each of the disks 132, 133 and 135 has the shape of a perforated circular flat plate into which the mounting shaft part 28 of the piston rod 21 is capable of being fitted and which has a constant thickness. The housing main body 131 and the lid member 139 each has the shape of a circular ring, into which the mounting shaft part 28 of the piston rod 21 is capable of being fitted, and constitute a housing 140. In other words, the piston rod 21 is disposed inside the housing 140.

The housing main body 131 has a base part 141 shaped of a perforated circular plate, inner cylindrical parts 142, a seat part 143, and a cylindrical part 166. The inner cylindrical parts 142 are cylindrical members that are formed on an inner circumferential side of the base part 141 and extend in a thickness direction of the base part 141. The seat part 143 is a cylindrical member that is formed on an outer circumferential side of the base part 141 relative to the inner cylindrical parts 142 and extends in the thickness direction of the base part 141. The cylindrical part 166 is a cylindrical member that is formed on an outer circumferential side of the base part 141 relative to the seat part 143 and extends in the thickness direction of the base part 141. The inner cylindrical parts 142 protrude from the base part 141 on opposite sides of the base part 141 in the axial direction. The seat part 143 protrudes from the base part 141 only on one side of the base part 141 in the axial direction. The cylindrical part 166 protrudes from the base part 141 only on the same side as the seat part 143. A small-diameter hole 145, into which the mounting shaft part 28 of the piston rod 21 is fitted on the opposite side of the protruding direction of the seat part 143 in the axial direction, is formed inside the inner cylindrical parts 142, and a large-diameter hole 146 having a diameter larger than the small-diameter hole 145 is formed close to the seat part 143 in the axial direction. The lid member 139 is fitted into the cylindrical part 166 of the housing main body 131, and the tubular housing 140 is constituted of the lid member 139 and the housing main body 131.

The inner cylindrical part 142 of the housing main body 131 supports an inner circumferential side of the disk 62 at an end portion thereof in the vicinity of the small-diameter hole 145 in an axial direction thereof, and supports an inner circumferential side of the disk 132 at an end portion thereof in the vicinity of the large-diameter hole 146 in the axial direction thereof. The seat part 143 of the housing main body 131 supports an outer circumferential side of the annular partition disk 134 at an end portion of a protruding tip side thereof. A cutout 203 is partly formed in the seat part 143 in a circumferential direction, acid inner and outer sides of the seat part 143 in the radial direction in the housing main body 131 always communicate with each other.

An outer diameter of the disk 132 is larger than a diameter of a portion of the inner cylindrical part 142 which comes into contact with the disk 132, and is smaller than an inner diameter of the seat part 143. A cutout 151, which extends outward from an inner circumferential edge thereof fitted around the mounting shaft part 28 of the piston rod 21 in the radial direction, is formed in the disk 132. The cutout 151 crosses the inner cylindrical part 142 in the radial direction at the contact portion which comes into contact with the disk 132. Outer diameters of the two disks 133 are smaller than the outer diameter of the disk 132.

The partition disk 134 is made up of a disk 155 and an elastic seal member 156. The disk 155 is formed of a metal, has a constant thickness, and is shaped of a perforated circular flat plate. The elastic seal member 156 is formed of a rubber and is fixedly attached on an outer circumferential side of the disk 155. The partition disk 134 has a circular ring shape as a whole, and is configured to be elastically deformable and be bendable. The disk 155 has an inner diameter such that the disks 133 is capable of being disposed inside with the radial direction, and has a thickness smaller than a thickness corresponding to the two disks 133. The disk 155 has an outer diameter larger than an outer diameter of the seat part 143 of the housing main body 131.

The elastic seal member 156 has a circular ring shape and is fixedly attached on the outer circumferential side of the disk 155. The elastic seal member 156 has a seal main body 158 and a plurality of protrusions 159. The seal main body 158 is an annular member that protrudes from the disk 155 to the opposite side of the lid member 139 in the axial direction. The protrusions 159 protrude from the disk 155 at a plurality of portions close to the lid member 139 in the axial direction along a circular ring shape. An annular gap is provided between the disk 155 and the housing main body 131, and the seal main body 158 and the plurality of protrusions 159 are fixedly attached to opposite surfaces of the disk 155 via this gap of the elastic seal member 156. With this constitution, the elastic seal member 156 is fixedly attached to the disk 155 with ease.

An inner diameter of an end portion of the seal main body 158 close to the disk 155, that is, a minimum inner diameter thereof is larger than the outer diameter of the seat part 143. Thus, in the partition disk 134, the disk 155 is capable of being seated on the seat part 143 of the housing main body 131. The plurality of protrusions 159 are disposed at intervals in a circumferential direction. Due to a gap between the protrusions 159 adjacent to each other, when a pressure of the lower chamber 20 become a higher pressure than a variable chamber 171 (to be described below), the disk 155 of the partition disk 134 is seated on the seat part 143 from a state where the plurality of protrusions 159 are in contact with the lid member 139. Since the cutout 203 is provided in the seat part 143, a pressure-receiving area of a side at which the seal main body 158 of the disk 155 is nearly the same as that of a side at which the protrusions 159 are provided.

Outer diameter of the disks 135 are larger than the inner diameter of the disk 155 of the partition disk 134. Thus, an inner circumferential side of the partition disk 134 is disposed between the disk 132 and the disks 135, and is supported by coming in contact with the disks 135. The partition disk 134 is configured such that the inner circumferential side thereof between the disk 132 and the disks 135 is movable within a range of lengths of the two disks 133 in the axial direction. An annular elastic seal member 156, which seals between the partition disk 134 and the housing 140, is provided on an outer circumferential side of the partition disk 134 which is an unsupported side. In the partition disk 134, the elastic seal member 156 is centered with respect to the housing 140 by coming into contact with the housing 140. In other words, the partition disk 134 has a simple supporting structure in which the inner circumferential side thereof is not clamped from both surface sides thereof and is supported only on one surface side thereof by the disks 135.

The lid member 139 has the shape of a perforated circular plate into which the mounting shaft part 28 of the piston rod 21 is capable of being fitted, and is fitted into the cylindrical part 166 of the housing main body 131. A through-hole 167, which axially passes through a midway of the lid member 139 in the radial direction, is formed in the lid member 139. In the lid member 139, the through-hole 167 is formed outside the disks 135 in the radial direction. The through-hole 167 is formed inside a contact portion of the elastic seal member 156 which comes into contact with the lid member 139 in the radial direction due to bending of the disk 155.

The seal main body 158 of the partition disk 134 comes into contact with an inner circumferential surface of the cylindrical part 166 of the housing main body 131 over the entire circumference, and seals a gap between the partition disk 134 and the cylindrical part 166. That is, the partition disk 134 is a packing valve. The seal main body 158 always seals the gap between the partition disk 134 and the cylindrical part 166 even if the partition disk 134 is deformed in the housing 140 within an allowed range. The seal main body 158 of the partition disk 134 comes into contact with the cylindrical part 166 over the entire circumference, and thereby the partition disk 134 is centered with respect to the housing 140 as described above. The partition disk 134 partitions the inside of the housing 140 into a variable-volume variable chamber 171 of the housing main body 131 which is close to the base part 141 and a varible-volume variable chamber 172 of the housing main body 131 which is close to the lid member 139. In other words, the two variable chambers 171 and 172 are defined by the partition disk 134, and are provided inside the housing 140. The variable chamber 171 communicates with a passage between the large-diameter hole 146 of the housing main body 131 and the mounting shaft part 28 via a passage inside the cutout 151 of the disk 132. The variable chamber 172 communicates with the lower chamber 20 via a passage inside the through-hole 167 of the lid member 139.

The passage groove 30 of the piston rod 21 faces the large-diameter hole 202 of the piston 18, the cutout 87 of the disk 51, the cutout 91 of the disk 54, the large-diameter hole 76 of the pilot case 55, the large-diameter hole 146 of the housing main body 131, and the cutout 151 of the disk 132 in the radial direction of the piston rod 21. Accordingly, the passages 38 of the piston 18, the back-pressure chamber 80, and the variable chamber 171 always communicate with one another via the passage inside the cutout 87 of the disk 51, the passage between the large-diameter hole 202 of the piston 18 and the moan haft part 28, the passage inside the passage groove 30 of the piston rod 21, the passage inside the cutout 91 of the disk 54, the passage between the large-diameter hole 76 of the pilot case 55 of the extension-side damping force generation mechanism 41 and the mounting shaft part 28, the passage between the large-diameter hole 146 of the housing plain body 131 of the damping force variable mechanism 43 and the mounting shaft part 8, and the passage inside the cutout 151 of the disk 132.

As described above, the passage inside the cutout 87 of the disk 51, the passage between the large-diameter hole 202 of the piston 18 and the mounting shaft part 28, the passage inside the passage groove 30 of the piston rod 21, the passage inside the cutout 91 of the disk 54, the passage between the large-diameter hole 76 of the pilot case 55 and the mounting shaft part 28 constitute a back-pressure chamber inflow passage 235 that always causes the passages 38 of the piston 18 to communicate with the back-pressure chamber 80. The passage inside the passage groove 30 of the piston rod 21 extends from the back-pressure chamber inflow passage 235 to the opposite side of the piston 18. This portion inside the passage groove 30, the passage between the large-diameter hole 146 of the housing main body 131 and the mounting shaft part 28, the passage inside the cutout 151 of the disk 132, the variable chambers 171 and 172 inside the housing 140, and the passage inside the through-hole 167 of the lid member 139 serve as a branch passage (a second passage) 241. The branch passage 241 branches off from the back-pressure chamber inflow passage 235 ranging from the passages 38 to the back-pressure chamber 80, and communicates with the lower chamber 20.

In other words, the back-pressure chamber 80 always communicates with variable chamber 171 of the damping force variable mechanism 43 via a part of the branch passage 241, the passage inside the cutout 91 of the disk 54 which is a part of the back-pressure chamber inflow passage 235, the passage between the large-diameter hole 76 of the pilot case 55 and the mounting shaft part 28, and the passage inside the passage groove 30 of the piston rod 21. The variable chamber 172 of the damping force variable mechanism 43 always communicates with the lower chamber 20 via the through-hole 167 of the lid member 139.

The housing 140 of the damping force variable mechanism 43 is provided in the branch passage 241. Accordingly, the two variable chambers 171 and 172 that are a part of the branch passage 241 are defined by the partition disk 134, and are provided inside the housing 140. Here, the branch passage 241 need only branch off from any portion from the passages 38 to the hack-pressure chamber 80.

The partition disk 134 is made deformable within a range where the inner circumferential side thereof moves between the disk 132 and the disks 135 and where the outer circumferential side thereof moves between the seat part 143 and the lid member 139. Here, a shortest distance in the axial direction between the seat part 143 that supports the outer circumferential side of the disk 155 of the partition disk 134 from the first side in the axial direction and the disks 135 that support the inner circumferential side of the disk 155 from the second side in the axial direction is smaller than the thickness of the disk 155 in the axial direction. Accordingly, when the variable chambers 171 and 172 have the same pressures, the disk 155 is in contact with the seat part 143 and the disks 135 under pressure over the entire circumference with its own elastic force in a slightly deformed state.

In a state there the inner circumferential side of the partition disk 134 is in contact with the disks 135 over the entire circumference, the partition disk 134 obstructs a flow of oil between the variable chambers 171 and 172 of the branch passage 241. Further, in a state where the inner circumferential side of the partition disk 134 is separated from the disks 135, the partition disk 134 allows circulation of oil between the variable chamber 171 and the variable chamber 172, that is, allows circulation with the lower chamber 20. Accordingly, the inner circumferential side of the partition disk 134 and the disks 135 constitute a check valve 245 that regulates a flow of oil from the variable chamber 171 toward the lower chamber 20 in the branch passage 241, but allows a flow of oil from the lower chamber 20 toward the variable chamber 171.

The check valve 245 obstructs the branch passage 241 that enables the upper chamber 19 and the lower chamber 20 to communicate with each other via the passages 38 of the piston 18 and the back-pressure chamber inflow passage 235 in an extension stroke in which a pressure of the upper chamber 19 is higher than a pressure of the love chamber 20. On the other hand, in a contraction stroke in which the pressure of the upper chamber 19 is lower than the pressure of the lower chamber 20, the check valve 245 maintains the branch passage 241 in a communication state that enables the upper chamber 19 and the lower chamber 20 to communicate with each other via the passages 38 of the piston 18 and the back-pressure chamber inflow passage 235.

The check valve 245 is a free valve in which the entirety of the partition disk 134 that is a valve body thereof is movable in the axial direction. The partition disk 134 may be set to consistently bring the entire inner circumference thereof into contact with the disks 135 regardless of pressure conditions of the variable chambers 171 and 172, and be configured to obstruct circulation between the variable chambers 171 and 172 of the branch passage 241 at all times. That is, the partition disk 134 need only obstruct circulation to at least one side of the branch passage 241.

The annular member 117, the disk 116, the disk 115, the plurality of disks 114, the plurality of disks 113, the disk 112, the disk 111, the piston 18, the disk 51, the disk 211, the disk 212, the disk 213, the pilot valve 52, the disk 53, the disk 54, the pilot case 55 the disk 56, the disk 57, the disk 58, the disk 59, the disk 60, the disk 61, the disk 62, the housing grain body 131, the disk 132, and the plurality of disks 133 are superimposed on the stepped shaft part 29 of the piston rod 21 in this order in a state where the mounting shaft part 28 is inserted thereinto. In this case, the pilot case 55 fits the seal member 86 of the pilot valve 52 into the outer cylindrical part 73.

In a state where the disks 133 are inserted into the partition disk 134, the partition disk 134 is superimposed on the seat part 143 of the housing main body 131. In this case, the elastic seal member 156 of the partition disk 134 is fitted into the cylindrical part 166 of the housing main body 131. Furthermore, in a state where the mounting shaft part 28 is inserted into the inside of the plurality of disks 135 and the lid member 139, the plurality of disks 135 and the lid member 139 are superimposed on the disks 133 and the disk 155 of the partition disk 134 in this order. In addition, the mounting shaft part 28 is inserted into a plurality of disks 248 and an annular member 175 that is a component common with the annular member 117, and the plurality of dirks 248 and the annular member 175 are superimposed on the lid member 139.

In a state where the components are disposed in this way, a nut 176 is screwed onto the male threads 31 of the mounting shaft part 28 that further protrudes than the annular member 175. Thus, the annular member 117, the disk 116, the disk 115, the plurality of disks 114, the plurality of disks 113, the disks 112 and 111, the piston 18, the disk 51, the disk 211, the disk 212, the disk 213, the pilot valve 52, the disks 53 and 54, the pilot case 55, the disks 56 to 62, the housing main body 131, the disk 132, the plurality of disks 133, the plurality of disks 135, the lid member 139, the plurality of disks 248, and the annular member 175 are sandwiched between the stepped shaft part 29 of the piston rod 21 and the nut 176 at inner circumferential sides and whole portions thereof, and are clamped in the axial direction. In this case, the inner circumferential side of the partition disk 134 is not clamped in the axial direction. The nut 176 is, for example, a generalized hexagonal nut.

Thus, the contraction-side damping force generation mechanism 42, the piston 18, the extension-side, damping force generation mechanism 41, and the extension-side damping force variable mechanism 43 are fastened to the piston rod 21 by the nut 176 in a state where the piston rod 21 is inserted on inner circumferential sides thereof. In other words, the housing main body 131, the disk 132, the plurality of disks 133, the plurality of disks 135, and the lid member 139 which constitute the damping force variable mechanism 43, and the piston 18 are fastened to the piston rod 21 by the nut 176 in a state where the piston rod 21 is inserted on the inner circumferential sides thereof. In a state where the damping force variable mechanism 43 is assembled in advance, it can also be mounted on the piston rod 21. In this case, a dummy rod is inserted instead of the piston rod 21, and the mounting shaft part 28 of the piston rod 21 is inserted on the inner circumferential side of the damping force variable mechanism 43 while pulling out the dummy rod. In the case where the damping force variable mechanism 43 is assembled in advance, the lid member 139 can be pressed in and fixed to the cylindrical part 166 of the housing main body 131.

As illustrated in FIG. 1, the aforementioned base valve 25 is provided between the bottom member 12 of the outer cylinder 4 and the inner cylinder 3. The base valve 25 has a base valve member 191, a disk 192, a disk 193, and a mounting pin 194. The base valve member 191 is a member with which the lower chamber 20 and the reservoir chamber 6 are partitioned. The disk 192 is provided on a lower side of the base valve member 191, that is, close to the reservoir chamber 6. The disk 193 is provided on upper ides of the disk 192 and the base valve member 191, that is, close to the lower chamber 20. The mounting pin 194 mounts the disk 192 and the disk 193 on the base valve member 191.

The base valve member 191 has an annular shape in which the mounting pin 194 is inserted in the center thereof in the radial direction. A plurality of passage holes 195 and 196 are formed in the base valve member 191. The plurality of passage holes 195 cause oil to circulate between the lower chamber 20 and the reservoir chamber 6. The plurality of passage holes 196 cause oil to circulate between the lower chamber 20 and the reservoir chamber 6 outside the passage holes 195 in the radial direction. The disk 192 close to the reservoir chamber 6 allows a flow of oil from the lower chamber 20 toward the reservoir chamber 6 through the passage holes 195, and suppresses a flow of oil from the reservoir chamber 6 toward the lower chamber 20 through the passage holes 195. The disk 193 allows a flow of oil from the reservoir chamber 6 toward the lower chamber 20 through the passage holes 196, but suppresses flow of oil from the lower chamber 20 toward the reservoir chamber 6 through the passage holes 196.

The disk 192 and the base valve member 191 constitute a contraction-side damping valve 197. The damping valve 197 is opened in the contraction stroke of the shock absorber 1, so that oil flows from the lower chamber 20 to the reservoir chamber 6 and simultaneously a damping force is generated. The disk 193 and the base valve member 191 constitute a suction valve 198. The suction valve 198 is opened in the extension stroke of the shock absorber 1, so that oil flows from the reservoir chamber 6 into the lower chamber 20. The suction valve 198 functions to flow oil from the reservoir chamber 6 to the lower chamber 20 without practically generating a damping force so as to compensate for shortage of oil caused mainly by extension of the piston rod 21 out of the cylinder 2.

In a case where only the extension-side damping force generation mechanism 41 operates in the extension stroke in which the piston rod 21 moves to the extension side, when a movement speed (hereinafter referred to as "piston speed") of the piston 18 is slow, oil from the upper chamber 19 flows from the passages 38 inside the first passage holes 37 illustrated in FIG. 3 to the lower chamber 20 via the stationary orifice 216 of the damping valve 231 and the passage 88 between the piston 18 and the outer cylindrical part 73 of the pilot case 55, and simultaneously flows to the lower chamber 20 via the back-pressure chamber inflow passage 235 including the passage inside the cutout 87 of the disk 51, the back-pressure chamber 80, and the stationary orifice 100 of the disk valve 99, so that a damping force of an orifice characteristic (wherein the damping force is nearly proportional to a square of the piston speed) occurs. For this reason, a characteristic of the damping force against the piston speed shows that a rate of rise in the damping force to a rise in the piston speed becomes relatively high.

When the piston speed becomes fast, oil from the upper chamber 19 flows from a gap between the contact valve 221 and the valve seat art 47 of the piston 18 to the lower chamber 20 via the passage 88 while opening the contact valve 221 of the damping valve 231 toward the vicinity of the pilot valve 52 by a length of a gap outside the disk 213 in the radial direction, in addition to a flow from the passages 38 inside the first passage holes 37 to the vicinity of the lower chamber 20 through the back-pressure chamber inflow passage 235, the back-pressure chamber 80, and the stationary orifice 100 of the disk valve 99. As a result, a damping force of a valve characteristic (wherein the damping force is nearly proportional to a square of the piston speed) occurs. For this reason, a characteristic of the damping force against the piston speed shows that a rate of rise in the damping force to a rise in the piston speed falls down.

When the piston speed further becomes fast, oil from the upper chamber 19 flows to the lower chamber 20 by opening the disk valve 99 and passing between the disk valve 99 and the valve seat part 79 from the back-pressure chamber inflow passage 235 and the back-pressure chamber 80, in addition to a flow from the passages 38 inside the first passage holes 37 toward the lower chamber 20 through a gap between the contact valve 221 and the valve seat part 47. As a result, a rise in the damping force is further inhibited. For this reason, a characteristic of the damping force against the piston speed shows that a rate of rise in the damping force to a rise in the piston speed further falls down.

When the piston speed further becomes fast, a relationship of a force (an oil pressure) acting on the pilot valve 52 shows that a force applied from the passages 38 in an opening directions greater than that applied from the back-pressure chamber 80 in a closing direction. Accordingly, in this region, the contact valve 221 of the damping valve 231 is opened further away from the valve seat part 47 of the piston 18 than the above while deforming the disk 213 and the pilot valve 52 along with an increase in the piston speed. As a result, in addition to a flow of oil passing between the disk valve 99 and the valve seat part 79 from the passages 38 inside the first passage holes 37, the back-pressure chamber inflow passage 235, and the back-pressure chamber 80 to the lower chamber 20, more oil flows to the lower chamber 20 via the passage 88, and thus a rise in the damping force can be further suppressed. For this reason, a characteristic of the damping force against the piston speed shows that a rate of rise in the damping force to a rise in the piston speed further falls down.

Figure 6:
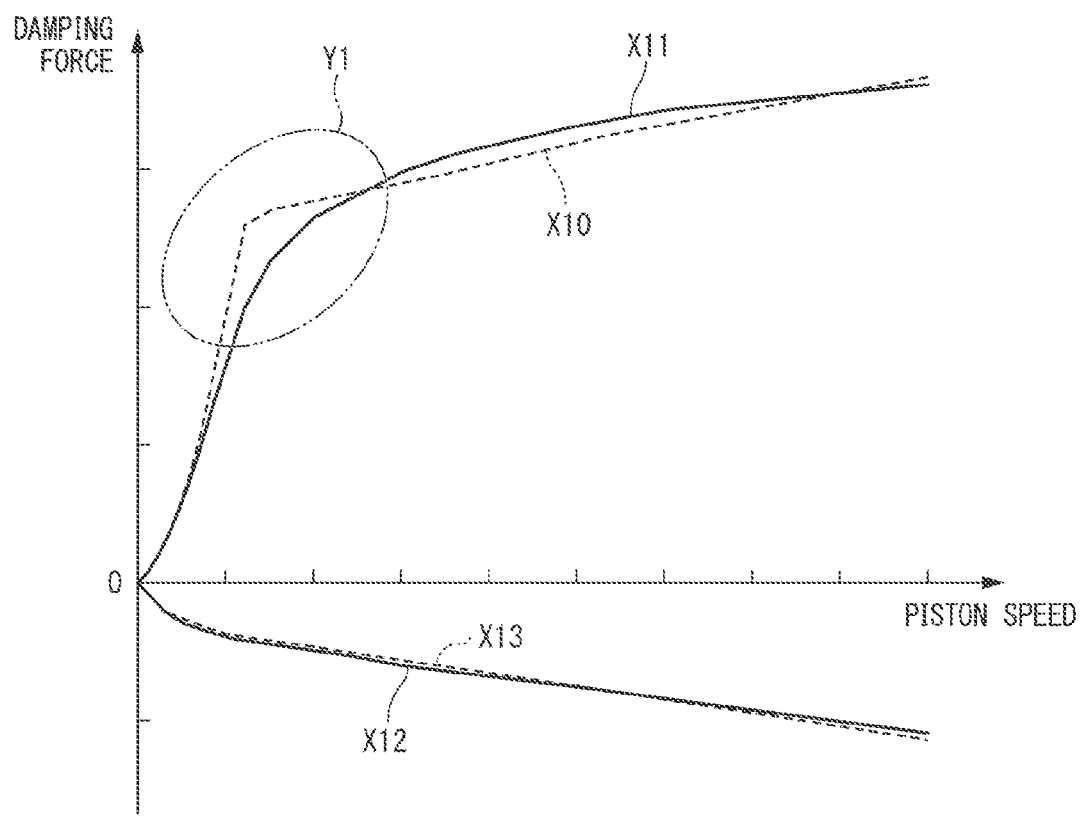
FIG. 6 is a characteristic diagram illustrating a relationship of a damping a piston speed of the shock absorber according to the first embodiment of the present invention.

In FIG. 6, a change in characteristic at the time of valve opening (a change from an orifice characteristic to a valve characteristic) in a structure in which the pilot valve disclosed Patent Document 1 directly opens and closes the passage of the piston is represented by a dashed line X10. The damping force characteristic of the shock absorber 1 according to the present embodiment is represented by a solid line X11 in FIG. 6. In the dashed line X10, the change in characteristic at the time of valve opening is sudden as represented by a range Y1. In contrast, the shock absorber 1 of the present embodiment opens and closes the passages 38 of the piston 18 by means of the damping valve 231 having a structure in which the disk 213 whose diameter s smaller than those of the contact valve 221 and the pilot valve 52 is provided between the contact valve 221 and the pilot valve 52, thereby opening the valves step by step. As a result, as represented by the solid line X11 in FIG. 6, the damping force characteristic of the shock absorber 1 according to the present embodiment is made smooth such that the change in characteristic at the time of opening of the damping valve 231 (the change from the orifice characteristic to the valve characteristic) is represented by the range Y1.

In the contraction stroke in which the piston rod 21 moves to the contraction side, when the piston speed is slow, oil from the lower chamber 20 flows to the upper chamber 19 via the passages 40 inside the contraction-side second passage holes 39 and the stationary orifice 123 of the disk valve 122 illustrated in FIG. 2, and a damping force of the orifice characteristic (wherein the damping force is nearly proportional to a square of the piston speed) occurs. For this reason, a characteristic of the damping force against the piston speed shows that a rate of rise in the damping force to a rise in the piston speed becomes relatively high. Further, when the piston speed becomes fast, oil introduced from the lower chamber 20 into the passages 40 inside the contraction-side second passage holes 39 basically flows to the upper chamber 19 by passing between the disk valve 122 and the valve seat part 49 while opening the disk valve 122, and a damping force of the valve characteristic (wherein the damping force is nearly proportional to the piston speed) occurs. For this reason, a characteristic of the damping force against the piston speed shows that a rate of rise in the damping force to a rise in the piston speed falls down.

Here, regarding the contraction stroke, since the damping force generation mechanism 42 of the shock absorber 1 of the present embodiment has the same structure as a conventional mechanism, the damping force characteristic of the shock absorber according to the present embodiment represented by the solid line X12 in FIG. 6 is the same as a damping force characteristic of a shock absorber of a conventional structure represented by a clashed line X13 in FIG. 6.

The described above is the case where only the damping force generation mechanisms 41 and 42 operate. However, in the first embodiment, even in a case where the piston speed is the same, the damping force variable mechanism 43 makes the damping force variable in accordance with a piston frequency.

That is, in an extension stroke when the piston frequency is high, a pressure of the upper chamber 19 becomes high, so that oil is introduced from the upper chamber 19 into the variable chamber 171 of the damping force variable mechanism 43 via the passages 38 inside the first passage holes 37 illustrated in FIG. 3, the back-pressure chamber inflow passage 235, and a portion of the branch passage 241 that branches off from the back-pressure chamber inflow passage 5 and which is closer to the back-pressure chamber inflow passage 235 than the variable chamber 171. Correspondingly, the partition disk 134 that has been in contact with the seat part 143 and the disks 135 so far discharges oil from the variable chamber 172 of the damping force variable mechanism 43, which is a portion of the branch passage 241 which is close to the lower chamber 20, to the lower chamber 20 via the passage inside the through-hole 167 of the lid member 139 while being deformed to get the protrusions 159 approaching the lid member 139.

Since the partition disk 134 is deformed in this way, a flow rate of the oil in which the oil is introduced, from the upper chamber 19 into the variable chamber 171 and passes through the passages 38 inside the first passage holes 37 from the upper chamber 19 while opening the damping force generation mechanism 41 and flowing to the lower chamber 20 is reduced. In addition, by introducing the oil from the upper chamber 19 into the variable chamber 171, a rise in a pressure of the back-pressure chamber 80 is suppressed compared to a case where the variable chamber 171 is not present, and the damping valve 231 of the damping force generation mechanism 41 tends to be easily opened. Thereby, an extension-side damping force is made soft. Here, since the inner circumferential side of the partition disk 134 is separated from the disk 132 and is supported only from one surface side by the disks 135, the inner circumferential side of the partition disk 134 is easily deformed to approach the disk 132. Accordingly, the protrusions 159 on the outer circumferential side of the partition disk 134 are easily deformed to approach the lid member 139.

On the other hand, in an extension stroke when the piston frequency is low, a frequency of the deformation of the partition disk 134 is also reduced by following the piston frequency. For this reason, while the oil flows from the upper chamber 19 to the variable chamber 171 in the initial stage of the extension stroke in the same way as described above, the partition disk 134 comes into contact with the lid member 139 afterward and comes to a stop, and the oil does not flow from the upper chamber 19 to the variable chamber 171. Thus, while the oil passes through the passages 38 inside the first passage holes 37 from the upper chamber 19 and opens the damping force generation mechanism 41, a flow rate of the oil flowing to the lower chamber 20 is not reduced. Further, since the oil does not flow from the upper chamber 19 to the variable chamber 171 in this way, a pressure of the back-pressure chamber 80 is raised, and the damping valve 231 of the damping force generation mechanism 41 is hardly opened. Thereby, an extension-side damping force is made hard.

In the contraction stroke, a pressure of the owe chamber 20 becomes high, but the partition disk 134 of the damping force variable mechanism 43 comes into contact with the seat part 143 of the housing main body 131, and enlargement of the variable chamber 172 is inhibited. For this reason, amount of the oil introduced from the lower chamber 20 into the variable chamber 172 via the passage inside the through-hole 167 of the lid member 139 is suppressed. As a result, a flow rate of the oil, which flows to the upper chamber 19 through being introduced from the lower chamber 20 into the passages 40 inside the second passage holes 39 and passing through the damping force generation mechanism 42, is not reduced, and a damping force is made hard. Further, since the inner circumferential side of the partition disk 134 is separated from the disks 135, a difference in pressure does not occur. As a result, the partition disk 134 is not further bent.

Since the shock absorber disclosed in Patent Document 1 above is configured to directly open/close the passage by the valve that receives the internal pressure of the back-pressure chamber, the characteristic at the time of valve opening is suddenly changed.

In contrast, in the first embodiment, the damping valve 231 has the contact valve 221 that opens and closes the openings of the passages 38 formed in the piston 18, the disk 213 that has an outer diameter smaller than the contact valve 221 and is provided on a valve opening side of the contact valve 221, and the pilot valve 52 that has an outer diameter larger than the disk 213 and is provided on a side of the disk 213 which is opposite to the contact valve 221 to defines the back-pressure chamber 80. For this reason, the contact valve 221 is minutely opened by a length of a gap formed by the disk 213 without coming into contact with the pilot valve 52 (i.e., without being affected by the internal pressure of the back-pressure chamber 80). As a result, when the contact valve 221 comes into contact with the pilot valve 52, further valve opening is regulated by the pilot valve 52. When the pressures of the passages 38 are sufficiently higher than the pressure of the back-pressure chamber 80, the contact valve 221 is widely opened while deforming the disk 213 and the pilot valve 52. Accordingly, a transient characteristic (a change in characteristic from before the valve opening to after the valve opening) at the time of opening of the damping valve 231 becomes smooth. As a result, a transmission force transmitted to a vehicle body by the shock absorber 1 becomes more natural, unnecessary vibration caused by a sudden change in the transmission force is suppressed, and ride quality is improved.

Further, the damping force variable mechanism 43 has the housing 140 provided in the branch passage 241, and the variable chambers 171 and 172 are defined in the housing 140 by the annular bendable partition disk 134 on which the annular elastic seal member 156, which seals between the partition disk 134 and the housing 140, is provided. For this reason, an axial length of the shock absorber 1 is capable of being shortened, and the shock absorber 1 is capable of being miniaturized by shortening the entire basic length thereof.

Further, the axial length of the damping force variable mechanism 43 can be shortened. For this reason, the inner circumferential sides of the contraction-side damping force generation mechanism 42, the piston 18, the extension-side damping force generation mechanism 41, and the damping force variable mechanism 43 is capable of being fastened to the piston rod 21 by the generalized nut 176 in the state where the piston rod 21 is inserted thereinto. Accordingly, the contraction-side damping force generation mechanism 42, the piston 18, the extension-side damping force generation mechanism 41, and the damping force variable mechanism 43 is capable of being easily fastened to the piston rod 21, and assemblability is capable of being exponentially improved.

Further, the r circumferential side of the partition disk 134 is not clamped from both surface sides thereof and is supported only on one surface side thereof. For this reason, deformation is made easy, and volumes of the variable chambers 171 and 172 is capable of being easily changed. Accordingly, responsiveness of the damping force variable mechanism 43 is capable of being improved.

The extension-side damping force generation mechanism 41 includes the damping valve 231 that inhibits a flow of oil caused by sliding of the piston 18 and generates a damping force, and the back-pressure chamber 80 that applies a pressure to the damping valve 231 in a valve closing direction, and is a pressure control type that introduces a part of the flow of oil into the back-pressure chamber 80 and controls opening of the damping valve 231 by using a pressure of the back-pressure chamber 80. Even if a variable width of a volume of the damping force variable mechanism 43 is small, a damping force can be made variable from a low-speed region of the piston 18 where the flow of oil from the upper chamber 19 toward the lower chamber 20 is a low flow rate to a high-speed region of the piston 18 where the flow of oil becomes a high flow rate. Accordingly, for example, a piston speed can improve a high-frequency impact shock to soft ride quality at a high speed.

Since a portion of the branch passage 241 which is formed at the piston rod 21 is formed by the passage groove 30 formed in an outer circumferential portion of the mounting shaft part 28 of the piston rod 21, working is made easy.

In the shock absorber 1, the damping force variable mechanism 43 that functions in the extension stroke is provided, but no damping force variable mechanism that functions in the contraction stroke is provided. For this reason, a damping force is made variable in response to a piston frequency, for example, in the extension stroke while inhibiting an increase in cost, and thereby the ride quality is effectively improved with respect to road surface conditions or the like. Even in a case where attitude control is difficult in a shock absorber having a damping force variable mechanism that makes a damping force variable in response to a piston frequency in a contraction stroke, this shock absorber is preferably used for a vehicle in which attitude control is effectively possible by the shock absorber having the damping force variable mechanism 43 that makes the damping force variable in response to the piston frequency in the extension stroke.

Figure 7:
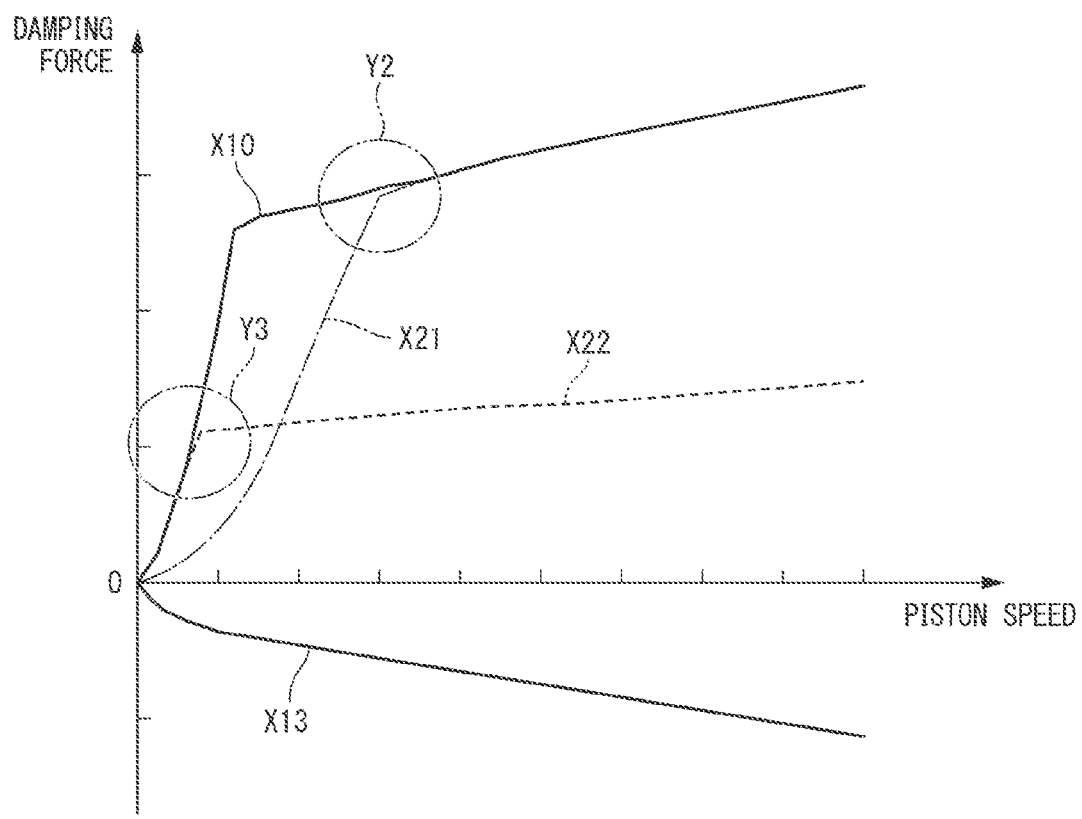
FIG. 7 is a characteristic diagram illustrating a relationship of a damping force to a piston speed of a shock absorber having a pressure control type damping force variable mechanism and a shock absorber having a flow rate control type damping force variable mechanism.

Here, the damping force variable mechanism 43 is a pressure control type that changes a valve-opening pressure of the damping force generation mechanism 41. However, instead of the damping force variable mechanism 43, a flow rate control type damping force variable mechanism (e.g., see Japanese Unexamined Patent Application, First publication No. 2011-202800) in which an orifice region is variable may be provided. In FIG. 7, a damping force characteristic of a shock absorber using a flow rate control type damping force variable mechanism is represented by an alternate long and short dash line X21; a damping force characteristic of the shock absorber that has a structure in which the pilot valve directly opens and closes the passage of the piston and that is disclosed in Patent Document 1 is represented by a solid line X10; and a damping force characteristic of a shock absorber using a pressure control type damping force variable mechanism is represented by a dashed line X22. A solid line X13 of FIG. 7 represents a contraction-side damping force characteristic without the damping force variable mechanism. As represented by the alternate long and short dash line X21 in FIG. 7, when the flow rate control type damping force variable mechanism is used, a slope of an orifice region in a high-frequency region in which a damping force becomes soft becomes gentle with respect to the damping force characteristic of Patent Document 1 represented by the solid line X10 in FIG. 7, and a transient characteristic of valve opening becomes slightly smooth as represented by a range Y2, so that an effect is small. In contrast, when the pressure control type damping force variable mechanism is used, a transient characteristic of valve opening does not become smooth as represented by a range Y3 even in a high-frequency region in which a damping force becomes soft as represented by the dashed line X22 in FIG. 7. Consequently, an effect of using the damping valve 231 of the first embodiment is great.

Second Embodiment

Figure 8:
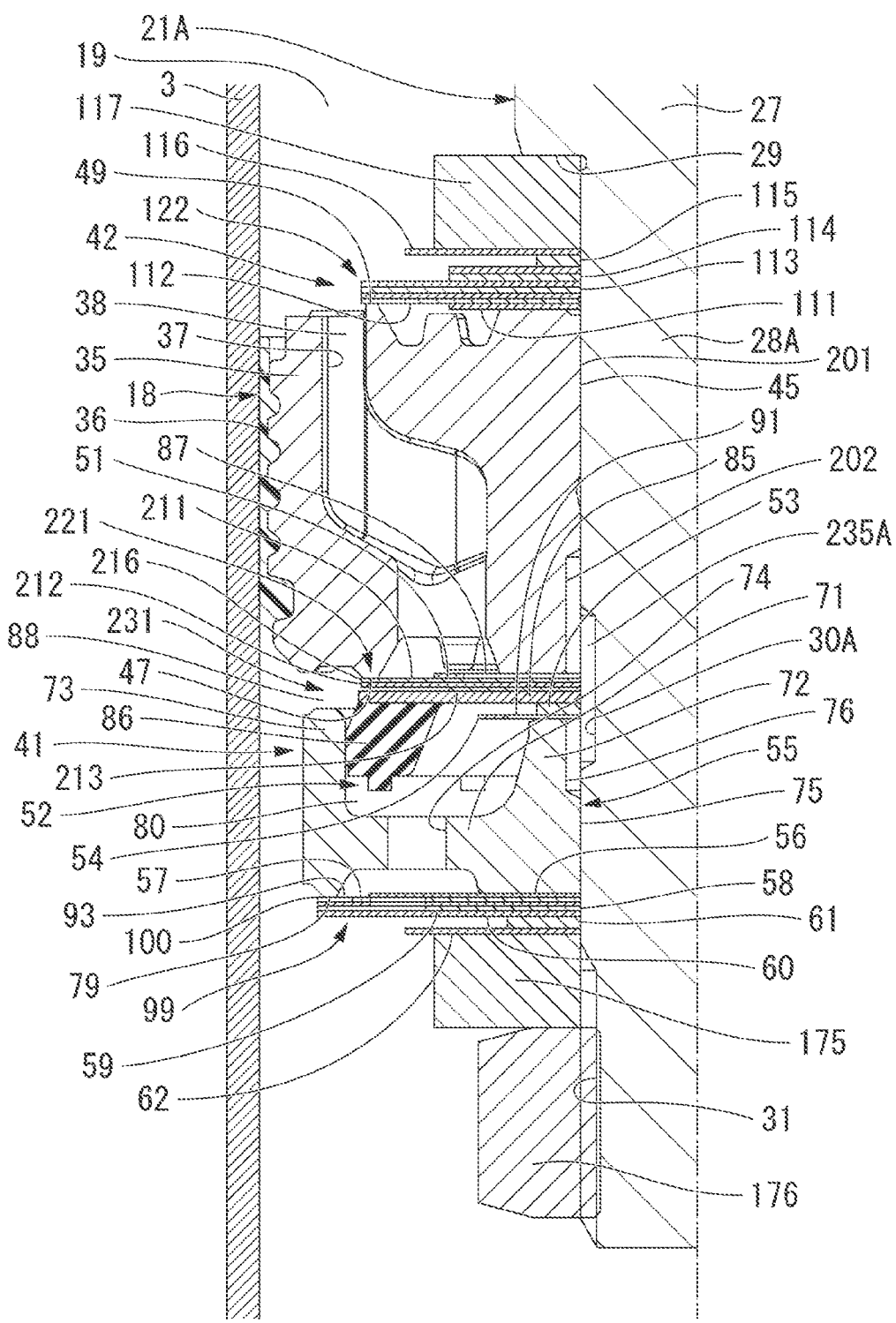
FIG. 8 is a partial sectional view illustrating surroundings of a piston and a clamping force generation mechanism of a shock absorber according to a second embodiment of the present invention.

Next, a second embodiment of the Shock absorber of the present invention will be mainly described on the basis of FIG. 8 with regard to different portions from the first embodiment. Portions common with those of the first embodiment are expressed by the same names and reference signs.

In the second embodiment, the damping force variable mechanism 43 of the first embodiment is not provided. For this reason, a piston rod 21A used in the present embodiment is different from the piston rod 21 of the first embodiment in that it has a mounting shaft part 28A shorter than the mounting shaft part 28 of the first embodiment in an axial direction and a passage groove 30A whose length is shorter than that of the passage groove 30. In the present embodiment, an annular member 175 comes into contact with a disk 62.

A back-pressure chamber inflow passage 235A communicates passages 38 of a piston 18 with a back-pressure chamber 80, and introduces oil from the passages 38 into the back-pressure chamber 80. The passage groove 30A of the piston rod 21A faces a large-diameter hole 202 of the piston 18, a cutout 87 of a disk 51, a cutout 91 of a disk 54, and a large-diameter hole 76 of a pilot case 55 in a radial direction of the piston rod 21A. Accordingly, the back-pressure chamber inflow passage 235A is made up of a passage inside the cutout 87 of the disk 51, a passage between a large-diameter hole 202 of the piston 18 and the mounting shaft part 28A, a passage inside the passage groove 30A of the piston rod 21, a passage inside the cutout 91 of the disk 54, and a passage between the large-diameter hole 76 of the pilot case 55 and the mounting shaft part 28A.

In the second embodiment, like the first embodiment, a change in characteristic at the time of valve opening of a damping valve 231 of an extension-side damping force generation mechanism 41 becomes smooth.

Third Embodiment

Figure 9:
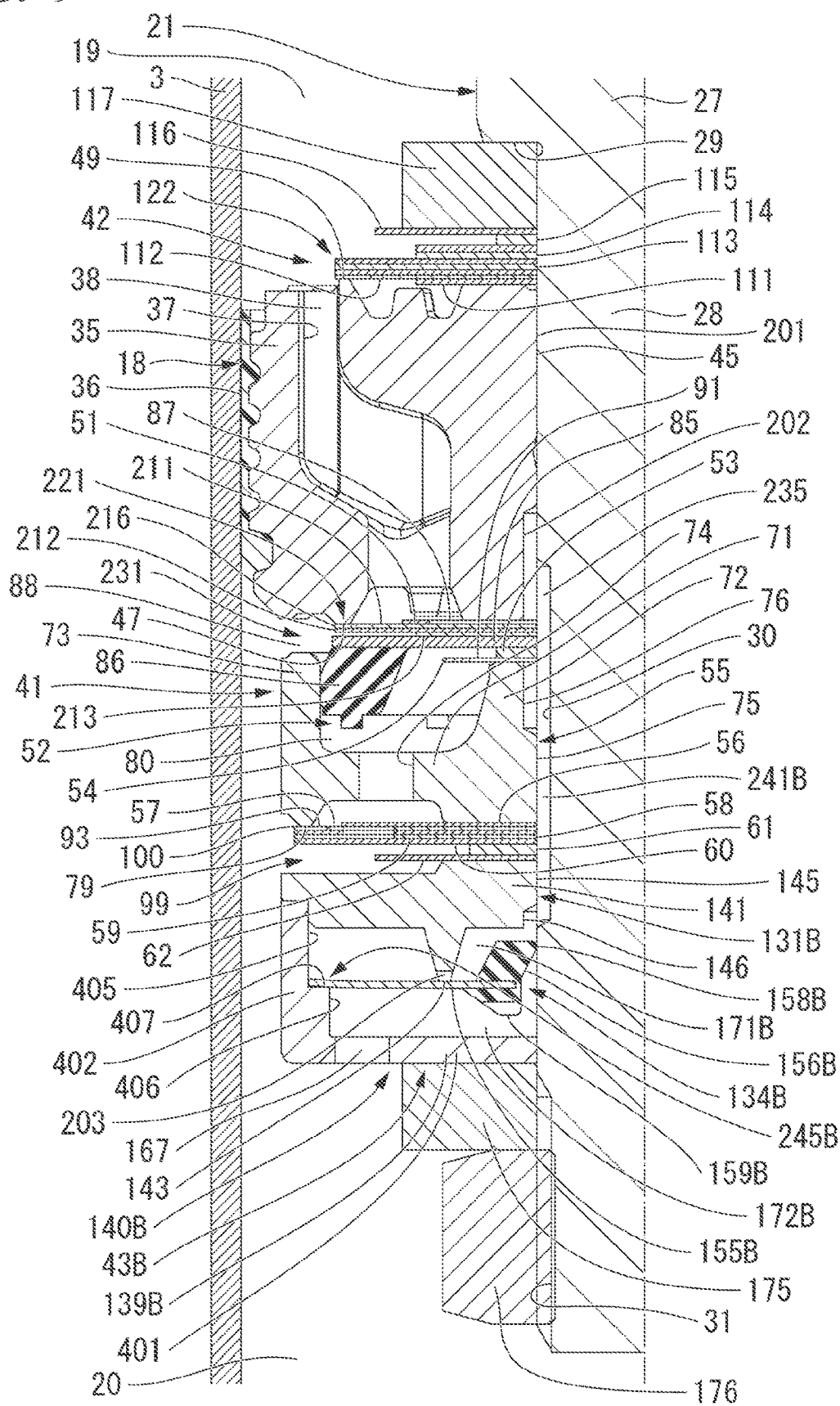
FIG. 9 is a partial sectional view illustrating surroundings of a piston, a damping force generation mechanism, and a damping force variable mechanism of a shock absorber according to a third embodiment of the present invention.

Next, a third embodiment of the shock absorber of the present invention will be mainly described on the basis of FIG. 9 with regard to different portions from the first embodiment. Portions common with those of the first embodiment are expressed by the same names and reference signs.

In the shock absorber according to the third embodiment, a damping force variable mechanism 431 that is partly different from the extension-side damping force variable mechanism 43 of the first embodiment is provided.

In the damping force variable mechanism 43B, a lid member 131B is provided close to a damping force generation mechanism 41 in an axial direction. The lid member 131B almost has a shape of the housing main body 131 without the cylindrical part 166 of the first embodiment. The lid member 131B has a base part 141, a seat part 143, a small-diameter hole 145, a large-diameter hole 146, and a cutout 203. The inner cylindrical part 142 of the first embodiment is not provided on the lid member 131B.

Further, a housing main body 139B is provided on the damping force variable mechanism 43B on the opposite side of the damping force generation mechanism 41 in the axial direction. The housing main body 139B has a shape in which a cylindrical part 402 is formed at a bottom part 401 similar to the lid member 139 of the first embodiment. The housing main body 139B has a through-hole 167 in the bottom part 401. The lid member 131B is fitted into the cylindrical part 402 of the housing main body 139B, and thereby the lid member 131B and the housing main body 139B define a housing 140B.

The seat part 143 of the lid member 131B supports a partition disk 134B. The partition disk 134B is made up of a metal disk 155B shaped of perforated circular plate and a rubber elastic seal member 156B fixedly attached on an inner circumferential side of the disk 155B. The partition disk 134B is shaped of a circular ring as a whole, and is configured to be elastically deformable, that is, be bendable. The elastic seal member 156B is provided at an inner circumferential portion of the partition disk 134B located close to a piston rod 21.

On an inner circumferential side of the cylindrical part 402 of the housing main body 139B, a large diameter part 405 is provided on the opposite side of the bottom part 401 in the axial direction and a small diameter part 406 having an inner diameter smaller than the large diameter 405 is provided close to the bottom part 401. A step part 407 extending in an axially orthogonal direction is formed between the large diameter part 405 and the small diameter part 406. The step part 407 supports an outer diameter side of the disk 155B which is an outer circumferential side of the partition disk 134B. An axial dimension between the step part 407 and the seat part 143 is set to be smaller than a thickness of the disk 155B. Thereby, a set load is capable of being given to the partition disk 134B.

The elastic seal member 156B has an annular seal main body 158B and annular protrusions 159B. The seal main body 158B protrudes from the disk 155B to the vicinity any of the lid member 131B in the axial direction. The protrusions 159B protrude from the disk 155B to the opposite side of the lid member 131B in the axial direction. The seal main body 158B of the elastic seal member 156B where is an unsupported side seals between the partition disk 134B and the piston rod 21.

The partition disk 134B partitions the inside of the housing 140B into a variable-volume variable chamber 171B close to the lid member 131B and a variable-volume variable chamber 172B close to the bottom part 401 of the housing main body 139B. The variable chamber 171B communicates with a passage between the large-diameter hole 146 of the lid member 131B and a mounting shaft part 28. The variable chamber 172B communicates with a lower chamber 20 via a passage inside the through-hole 167 of the housing main body 139B.

A part of a passage inside a passage groove 30 of the piston rod 21 on the opposite side of the piston 18 in the axial direction, a passage between the large-diameter hole 146 of the damping force variable mechanism 43B and the mounting shaft part 28, the variable chambers 171B and 172B inside the housing 140B, and the passage inside the through-hole 167 of the housing main body 139B branch passage (a second passage) 241B. The branch passage 241B branches off from a back-pressure chamber inflow passage 235 ranging from passages 38 of the piston 18 to a back-pressure chamber 80, and communicates with the lower chamber 20. The housing 140B of the damping force variable mechanism 43B is provided in the branch passage 241B. The two variable chambers 171B and 172B that are a part of the branch passage 241B are defined by the partition disk 134B, and are provided inside the housing 140B.

In a state here the outer circumferential side of the partition disk 134B is in contact with the step part 407 over the entire circumference thereof, the partition disk 134B obstructs circulation of oil between the variable chambers 171B and 172B of the branch passage 241B. Further, in a state where the outer circumferential side of the partition disk 134B is separated from the step part 407, the partition disk 134B allows circulation of oil between the variable chamber 171B and the variable chamber 172B, that is, between the variable chamber 171B and the lower chamber 20. Accordingly, the outer circumferential side of the partition disk 134B and the step part 407 of the housing 140B constitutes a check valve 245B that regulates a flow of oil from the variable chamber 171B toward the lower chamber 20 in the branch passage 241B but allows a flow of oil from the lower chamber 20 toward the variable chamber 171B. The check valve 245B is configured to obstruct the branch passage 241B in an extension stroke but to allow communication of the branch passage 241B in a contraction stroke. The check valve 245B is a free valve in which the entirety of the partition disk 134B that is a valve body thereof is movable in the axial direction. The partition disk 134B may be set to consistently bring the entire circumference thereof into contact with the step part 407 regardless of pressure conditions of the variable chambers 171B and 172B, and be configured to obstruct circulation between the variable chambers 171B and 172B of the branch passage 241B at all times.

In the third embodiment, in an extension stroke when a piston frequency is high, a pressure of the upper chamber 19 becomes high, so that oil is introduced from upper chamber 19 into the variable chamber 171B of the damping force variable mechanism 43B via the passages 38 inside the first passage holes 37, the back-pressure chamber inflow passage 235, and a portion of the branch passage 241B that branches off from the back-pressure chamber inflow passage 235 and which is closer to the back-pressure chamber inflow passage 235 than the variable chamber 171B. Correspondingly, the partition disk 134B that has been in contact with the seat part 143 and the step part 407 so far deforms so as to get the protrusions 159B approaching the bottom part 401 of the housing main body 139B and discharges oil to the lower chamber 20 from the variable chamber 172B of the damping force variable mechanism 43B, which is a portion of the branch passage 241B and which is close to the lower chamber 20, via the passage inside the through-hole 167 of the housing main body 139B.

Since the partition disk 134B is deformed in this way. The oil is introduced from the upper chamber 19 into the variable chamber 171B due to a deformation of the partition disk 134B in this way, and thereby a flow rate of the oil, which flows to the lower chamber 20 through passing through the passages 38 inside the first passage holes 37 from the upper chamber 19 and opening the damping force generation mechanism 41, is reduced. In addition, a rise in a pressure of the back-pressure chamber 80 is suppressed compared to a case where the variable chamber 171B is not present, and the damping force generation mechanism 11 is capable of easily performing valve opening by introducing the oil from the upper chamber 19 into the variable chamber 171B. Thereby, an extension-side damping force is made soft. Here, since the outer circumferential side of the partition disk 134B is supported only from one surface side by the step part 407, the protrusions 159B on the inner circumferential side of the partition disk 134B are easily deformed so as to approach the bottom part 401.

On the other and, in an extension stroke when the piston frequency is low, a frequency of the deformation of the partition disk 134B is also reduced by following the piston frequency. For this reason, while the oil flows from the upper chamber 19 to the variable chamber 171B in the initial stage of the extension stroke, the partition disk 134B comes into contact with the bottom part 401 afterward and comes to a stop, and the oil does not flow from the upper chamber 19 to the variable chamber 171B. Thus, while the oil passes, a flow rate of the oil, which flows to the lower chamber 20 through passing through the passages 38 inside the first passage holes 37 from the upper chamber 19 and opening the damping force generation mechanism 41, is not reduced. In addition, since the oil does not flow from the upper chamber 19 to the variable chamber 171B, a pressure of the back-pressure chamber 80 is raised, and a damping valve 231 of the damping force generation mechanism 41 is hardly opened. Thereby, an extension-side damping force is made hard.

According to the third embodiment, the shock absorber 1 is capable of being miniaturized by shortening the entire basic length thereof. Further, since the number of components is reduced, assembly is made easier, and both a component cost and an assembly cost is capable of being further reduced.

In the above embodiment, the example in which the present invention is used for a double cylinder type hydraulic shock absorber has been given, but the present invention is not limited thereto. The present invention may be used for a mono-tube type hydraulic shock absorber in which a gas chamber is formed by a partition body which is slidable to the opposite side of an upper chamber 19 in a lower chamber 20 inside a cylinder 2 without providing an outer cylinder. In this case, the present invention may be used for any shock absorber that includes a pressure control valve using a packing valve having a structure in which a seal member is provided on a disk. Of course, the present invention may be applied to the aforementioned contraction-side damping force generation mechanism 42 or the aforementioned base valve 25. The present invention may also be applied in a case where an oil passage communicating with the inside of the cylinder 2 is provided outside the cylinder 2 and a damping force generation mechanism is provided in this oil passage. In the above embodiment, the hydraulic shock absorber is given as an example, but water or air may be used as a fluid.

The embodiment described above includes a cylinder in which a working fluid is encapsulated; a piston that is slidably fitted into the cylinder and is configured to partition an inside of the cylinder into two chambers that are a first chamber and a second chamber; a piston rod that is coupled to the piston and is configured to extend to an outside of the cylinder; a first passage which is provided in the piston and through which the working fluid flows out of the first chamber due to movement of the piston; a damping force generation mechanism that includes a damping valve and a back-pressure chamber, the damping valve being provided in the first passage and generating a damping force by inhibiting a flow of the working fluid that caused by sliding of the piston, the back-pressure chamber applying an internal pressure to the damping valve in a valve closing direction; and a back-pressure chamber inflow passage that is configured to introduce the working fluid from the first passage into the back-pressure chamber. The damping valve has: a first valve that opens and closes an opening of the first passage formed in the piston and comes into contact with the piston; a second valve that has an outer diameter smaller than the first valve and is provided on a valve opening side of the first valve; and a pilot valve that has an annular seal member at an outer circumferential portion thereof and defines the back-pressure chamber such that the seal member is slidably and tightly fitted into a cylindrical part included in a pilot case. In this way, the damping valve has the first valve that opens and closes the opening of the first passage formed in the piston, the second valve that has the outer diameter smaller than the first valve and is provided on the valve opening side of the first valve, and the pilot valve that forms the back-pressure chamber. For this reason, the first valve is easily opened by a length of a gap formed by the second valve before the pilot valve forming the back-pressure chamber is deformed and opened. Accordingly, a transient characteristic at the time of opening of the damping valve becomes smooth.

Further, the shock absorber further includes: a second passage configured to branch off from any portion from the first passage to the back-pressure chamber; a housing which is provided in the second passage and inside which the piston rod is disposed; an annular third valve which is supported on an inner circumferential side thereof or an outer circumferential side thereof and provided with an annular elastic seal member on an unsupported side of third valve, the third valve being bendable, and the elastic seal member sealing between the annular elastic seal member and the housing or between the annular elastic seal member and the piston rod. Thus, the two chambers are defined inside the housing by the annular third valve on which the annular elastic seal member sealing between the annular elastic seal member and the housing is provided. As a result, an axial length of the shock absorber is capable of being shortened, and be miniaturized by shortening the entire basic length thereof.

Further, the second valve is made up of the same diameter part having the same outer diameter as the first valve and a small diameter part having an outer diameter smaller than the same diameter part, and the first valve is stepwisely opened by the same diameter part and the small diameter part of the second valve.

Further, the back-pressure chamber inflow passage uses a cutout part formed on an outer circumferential portion of the piston rod by cutting out a part of a passage groove.

While each embodiment of the present invention has been described, the technical scope, of the present invention is not limited only to the above embodiments, but the present invention can change a combination of the components in each embodiment, make various modifications to each component, or eliminate each component without departing from the spirit or teaching of the present invention. The present invention is not limited by the above description, but is only limited by the appended claims.

INDUSTRIAL APPLICABILITY

According to the shock absorber, a shock absorber capable of making a transient characteristic at the time of valve opening smooth can be provided.

REFERENCE SIGNS LIST

1 Shock absorber
2 Cylinder
18 Piston
19 Upper chamber (first chamber)
20 Lower chamber (second chamber)
21, 21A Piston rod
38 Passage (first passage)
41 Damping force generation mechanism
52 Pilot valve
55 Pilot case
73 Outer cylindrical part (cylindrical part)
80 Back-pressure chamber
86 Seal member
134, 134B Partition disk (third valve)
140, 140B Housing
156, 156B Elastic seal member
171, 171B 172, 172B Variable chamber
213 Disk (second valve)
221 Contact valve (first valve
231 Damping valve
235, 235A Back-pressure chamber inflow passage
241, 241B passage (second passage)

The invention claimed is:

1. A shock absorber, comprising:
a cylinder in which a working fluid is encapsulated;
a piston slidably fitted into the cylinder and being configured to partition an inside of the cylinder into a first chamber and a second chamber;
a piston rod coupled to the piston and being configured to extend to an outside of the cylinder;
a first passage provided in the piston and through which the working fluid flows out of the first chamber due to movement of the piston;
a damping force generation mechanism including a damping valve and a back-pressure chamber, the damping valve being provided in the first passage and generating a damping force by inhibiting a flow of the working fluid that is caused by sliding of the piston, and the back-pressure chamber applying an internal pressure to the damping valve in a valve closing direction; and
a back-pressure chamber inflow passage configured to introduce the working fluid from the first passage into the back-pressure chamber,
wherein the damping valve includes:
a first valve which opens and closes an opening of the first passage formed in the piston and comes into contact with the piston;
a second valve having an outer diameter smaller than the first valve and being provided on a valve opening side of the first valve; and
a pilot valve having an annular seal member at an outer circumferential portion thereof and defining the back-pressure chamber such that the seal member is slidably and tightly fitted into a cylindrical part included in a pilot case,
the shock absorber further comprising:
a second passage configured to branch off from any portion of the first passage to the back-pressure chamber;
a housing provided in the second passage and inside which the piston rod is disposed;
an annular third valve supported on an inner circumferential side thereof or an outer circumferential side thereof and provided with an annular elastic seal member on an unsupported side of the third valve, the third valve being bendable, and the elastic seal member sealing between the annular elastic seal member and the housing or between the annular elastic seal member and the piston rod; and
two chambers provided inside the housing so as to be defined by the annular third valve.

2. The shock absorber according to claim 1, wherein the third valve obstructs circulation of the working fluid toward at least one side of the second passage.

3. The shock absorber according to claim 1, wherein the second valve having a same diameter part having the same outer diameter as the first valve and a small diameter part having an outer diameter smaller than the same diameter part, and the first valve is opened stepwise by the same diameter part and the small diameter part of the second valve.

4. The shock absorber according to claim 1, wherein the back-pressure chamber inflow passage uses a cutout part formed on an outer circumferential portion of the piston rod by cutting out a part of a passage groove.

* * * * *